US006230313B1

(12) United States Patent
Callahan, II et al.

(10) Patent No.: US 6,230,313 B1
(45) Date of Patent: May 8, 2001

(54) PARALLELISM PERFORMANCE ANALYSIS BASED ON EXECUTION TRACE INFORMATION

(75) Inventors: Charles David Callahan, II; Keith Arnett Shields; Preston Pengra Briggs, III, all of Seattle, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/221,005

(22) Filed: Dec. 23, 1998

(51) Int. Cl.[7] ........................................................ G06F 9/45
(52) U.S. Cl. .................................. 717/4; 714/35; 714/38; 709/106
(58) Field of Search ..................................... 702/169, 186, 702/187; 717/4; 709/100, 102, 106, 107; 714/27, 25, 26, 35, 38

(56) References Cited

U.S. PATENT DOCUMENTS

| | | |
|---|---|---|
| 4,872,167 | 10/1989 | Maezawa et al. . |
| 5,168,554 | * 12/1992 | Luke ...................................... 345/336 |
| 5,504,932 | 4/1996 | Vassiliadis et al. . |
| 5,557,761 | 9/1996 | Chan . |

(List continued on next page.)

FOREIGN PATENT DOCUMENTS

| | | |
|---|---|---|
| 197 10 252 | 2/1998 | (DE) . |
| 0537098 | 4/1993 | (EP) . |

(List continued on next page.)

OTHER PUBLICATIONS

Ji et al., "Performance measurements in multithreaded programs", SIGMETRICS '98, ACM, 1998, pp. 168–170.*

Cook et al., "Event–based detection of concurrency", SIGSOFT 98, ACM, 1998, pp. 35–45.*

Tsai et al., "Performance study of a concurrent multithreded processor", IEEE, 1998, pp. 24–35.*

No Author, "Method of tracing events in multi–threded OS/2 applications", IBM Tech. Disclosure Bulletin, Sep. 1993, pp. 19–22.*

(List continued on next page.)

*Primary Examiner*—Kakali Chaki
(74) *Attorney, Agent, or Firm*—Perkins Coie LLP; perkinscoie.com

(57) ABSTRACT

A system for conducting performance analysis for executing tasks. The analysis involves generating a variety of trace information related to performance measures, including parallelism-related information, during execution of the task. In order to generate the trace information, target source code of interest is compiled in such a manner that executing the resulting executable code will generate execution trace information composed of a series of events. Each event stores trace information related to a variety of performance measures for the one or more processors and protection domains used. After the execution trace information has been generated, the system can use that trace information and a trace information description file to produce useful performance measure information. The trace information description file contains information that describes the types of execution events as well as the structure of the stored information. The system uses the trace information description file to organize the information in the trace information file, extracts a variety of types of performance measure information from the organized trace information, and formats the extracted information for display. The system can use default or user-defined functions to extract and format trace information for display. After the system displays one or more types of performance measure information, a user of the system can then interact with the system in a variety of ways to obtain other useful performance analysis information.

3 Claims, 22 Drawing Sheets

U.S. PATENT DOCUMENTS

| | | |
|---|---|---|
| 5,594,864 | 1/1997 | Trauben . |
| 5,632,032 * | 5/1997 | Ault et al. .............................. 709/100 |
| 5,712,996 | 1/1998 | Schepers . |
| 5,805,892 * | 9/1998 | Nakajima ................................. 717/4 |
| 5,867,643 * | 2/1999 | Sutton .................................... 714/35 |
| 5,953,530 * | 9/1999 | Rishi et al. .............................. 717/4 |
| 6,002,872 * | 12/1999 | Alexander, III et al. ................ 717/4 |
| 6,009,269 * | 12/1999 | Burrows et al. ......................... 717/4 |
| 6,055,492 * | 4/2000 | Alexander, III et al. ............ 702/179 |
| 6,058,493 * | 5/2000 | Talley ..................................... 714/38 |
| 6,101,524 * | 8/2000 | Choi et al. ........................... 709/102 |
| 6,151,701 * | 11/2000 | Humphreys et al. ..................... 717/4 |

FOREIGN PATENT DOCUMENTS

| | | |
|---|---|---|
| 0855648 | 7/1998 | (EP) . |
| 0864979 | 9/1998 | (EP) . |
| 2307760 | 6/1997 | (GB) . |
| 0422945 | 4/1991 | (WO) . |
| 0455966 | 11/1991 | (WO) . |

OTHER PUBLICATIONS

Smith, Burton, "The End of Architecture," Keynote Address Presented at the 17$^{th}$ Annual Symposium on Computer Architecture, Seattle, Washington, May 29, 1990.

Richard Korry et al., "Memory Management in the Tera MTA System," 1995.

Gail Alverson et al., "Processor Management in the Tera MTA System," 1995.

Major System Characteristics of the TERA MTA, 1995.

Touzeau, Roy F., "A Fortran Compiler for the FPS–164 Scientific Computer," Proceedings of the ACM SIGPLAN '84 Symposium on Compiler Construction, SIGPLAN Notices 19(6):48–57, Jun. 1984.

Linton, Mark A., "The Evolution of Dbx," USENIX Summer Conference, Jun. 11–15, 1990.

David Callahan and Burton Smith, A Future–Based Parallel Language for a General–Purpose Highly–Parallel Computer, Languages and Compilers for Parallel Computing, MIT Press, 1990.

David Callahan et al., "Improving Register Allocation for Subscripted Variables," Proceedings of the ACM SIGPLAN Conference on Programming Language Design and Implementation, White Plains, New York, Jun. 20–22, 1990.

Adelberg, Brad et al., "The Strip Rule System for Efficiently Maintaining Derived Data," Sigmod Record, Association for Computing Machinery, New York, vol. 26, No. 2, Jun. 1, 1997.

Surajit, Chaudhuri and Umeshwar Dayal, "An Overview of Data Warehousing and OLAP Technology," Sigmod Record, Association for Computing, New York, vol. 26, No. 1, Mar. 1997.

Agrawal, Gagan and Joel Saltz, "Interprocedural Data Flow Based Optimizations for Compilation of Irregular Problems," Annual Workshop on Languages and Compilers for Parallel Computing, 1995.

Callahan, David, "Recognizing and Parallelizing Bounded Recurrences," Aug. 1991.

D.H. Bailey et al., "The NAS Parallel Benchmarks—Summary and Preliminary Results," Numerical Aerodynamic Simulation (NAS) Systems Division, NASA Ames Research Center, California, 1991.

Robert Alverson et al, "The Tera Computer System, " Proceedings of 1990 ACM International Conference on Supercomputing, Jun. 1990.

Gail Alverson et al., "Scheduling on the Tera MTA," Job Scheduling Strategies for Parallel Processing, 1995.

Briggs, Preston and Keith D. Cooper, "Effective Partial Redundancy Elimination," ACM SIGPLAN Notices, Association for Computing Machinery, New York, vol. 29, No. 6, Jun. 1, 1994.

Click, Cliff, "Global Code Motion, Global Value Numbering," ACM SIGPLAN Notices, Association for Computing Machinery, New York, vol. 30, No. 6, Jun. 1, 1995.

Sreedhar, Vugranam C. and Guang R. Gao, "Incremental Computation of Dominator Trees," ACM SIGPLAN Notices, Association for Computing Machinery, New York, vol. 30, No. 3, Mar. 1, 1995.

Galarowicz, Jim et al., "Analyzing Message Passing Programs on the Cray T3E with PAT and VAMPIR," Research Report, "Online!", May 1998.

Anderson, Jennifer, et al., "Continuous Profiling: Where Have All The Cycles Gone?," Operating Systems Review, ACM Headquarters, New York, vol. 31, No. 5, Dec. 1, 1997.

Tera MTA Principles of Operation, Nov. 18, 1997.

Goldman, Kenneth, J., "Introduction to Data Structures," 1996, Retrieved from Internet http://www.cs.wustl.edu/{kjg/CS101_SP97/Notes?Data Structures/structures.html.

A. Ram., et al., "Parallel Garbage Collection Without Synchronization Overhead," 12$^{th}$ Annual Symposium on Computer Architecture, Jun. 17, 1985.

H. Hayashi et al., "ALPHA: A High Performance Lisp Machine Equipped with a New Stack Structure and Garbage Collection System," 10$^{th}$ Annual International Symposium on Computer Architecture, 1983.

Smith, Burton, "Opportunities for Growth in High Performance Computing," Nov. 1994.

Gail Alverson et al., "Tera Hardware–Software Cooperation", Proceedings of Supercomputing 1997, San Jose, California, Nov. 1997.

* cited by examiner

Trace Information Description File

Trace Information Type Constants {     EVENT = 80000001
                                         DESCRIPTOR_OBJ = 80000002
                                         SWAP_OUT = 80000003             }

EventType Constants {    FUNCTION_ENTRY = 0
                         FUNCTION_EXIT = 1
                         USER_SPECIFIED = 2                              } event ProfileInfo {id = DESCRIPTOR_OBJ;
          structure {
                int         address;
                int         pc;
                EventType   kind : 8;
                string      function_name;                    } } event Profile { id = EVENT;
          structure {
                int64 info                select ProfileInfo address ;
                int64 team_id   :16;
                int64 thread_id :48;
                int64 current_time        COUNTS clock ;
                int64 issues_counter      COUNTS issues ;
                int64 mem_ops_counter     COUNTS memrefs ;
                int64 events0             COUNTS event0s ;
                int64 phantoms            COUNTS phantoms ;      }
          display_format =
                "Kind: %[info.kind]14s\n"
                "PC: 0x%[info.pc]x\n"
                "Team & Thread: %[team_id]d.%[thread_id]d\n"
                "Time#: %[current_time]d\n"
                "Phantoms#: %[phantoms]d\n";
          print_format =
                "Profile %[info.name]s %[info.kind]14s %[team_id]d.%[thread_id]d"
                "%[current_time]d:"
                "%[issues_counter]d %[mem_ops_counter]d %[events0]d %[phantoms]d\n" } event SwapOut {
          id = SWAP_OUT;
          structure {
                int64 team ;
                int64 clock         COUNTS clock ;
                int64 memrefs       COUNTS memrefs ;
                int64 issues        COUNTS issues ;
                int64 phantoms      COUNTS phantoms ;
                int64 ready         COUNTS ready ;
                int64 event0s       COUNTS event0s ;
                int64 event1s       COUNTS event1s ;
                int64 event2s       COUNTS event2s ;
                int64 event3s       COUNTS event3s ; } }

*Fig. 4A*

Execution Trace Information File

80000002
A7
83
0
"FunctionX"
8000002
A8
9B
1
"FunctionX"
80000001
A7
C
3C7
0A32
0092
0027
0038
0028
80000001
A7
9
726
0076
0023
001D
0024
001C
80000003
9
0082
002B
0022
001C
0007
0024
0304
000E
00B3

*Fig. 4B*

Trace Information Display Functions File define issues            field "issues_counter"
define phantoms       field "phantoms"

define issues_rate      rate (issues)
define available_rate   rate(issues+phantoms, 100000)

display available_rate
display if(available_rate > 0.0, issues_rate/available_rate)

SourceViewer — ./mg.f (1525 lines) — Annotation Details

```
          i3 = 2*j3-d3
          do j2=2,m2j-1
            i2 = 2*j2-d2
            do j1=2,m1j
              i1 = 2*j1-d1
23 SSP        x1(i1-1) = r(i1-1,i2-1,i3) + r(i1-1,i2+1,i3)
                       + r(i1-1,i2,  i3-1) + r(i1-1,i2,  i3+1)
23 SSP        y1(i1-1) = r(i1-1,i2-1,i3-1) + r(i1-1,i2-1,i3+1)
                       + r(i1-1,i2+1,i3-1) + r(i1-1,i2+1,i3+1)
            enddo
            do j1=2,m1j-1
24 --P        y2 = r(i1,  i2-1,i3-1) + r(i1,  i2-1,i3+1)
                 + r(i1,  i2+1,i3-1) + r(i1,  i2+1,i3+1)
24 --P        x2 = r(i1,  i2-1,i3  ) + r(i1,  i2+1,i3  )
                 + r(i1,  i2,  i3-1) + r(i1,  i2,  i3+1)
24 --P        s(i1,i2,i3) =
                   0.500  * r(i1,i2,i3)
                 + 0.2500 * ( r(i1-1,i2,i3) + r(i1+1,i2,i3) + x2 )
                 + 0.1250 * ( x1(i1-1) + x1(i1+1) + y2 )
                 + 0.062500 * ( y1(i1-1) + y1(i1+1) )
```

630, 635, 640, 645

Loop 23 in rprj3_ at line 632 in loop 22
in parallel phase 3
block scheduled
Loop scheduled: 10 memory operations, 6 floating point operations
              10 instructions, needs 25 streams for full utilization Loop 22 in rprj3_ in loop 21
Loop 21 in rprj3_ in region 20

Close          Help

*Fig. 5E*

PARALLELISM PERFORMANCE ANALYSIS BASED ON EXECUTION TRACE INFORMATION

TECHNICAL FIELD

The present invention relates generally to analyzing the performance of the execution of a program, and more particularly to analyzing the degree and efficiency of the parallelism during the execution.

BACKGROUND OF THE INVENTION

Parallel computer architectures generally provide multiple processors that can each be executing different tasks simultaneously. One such parallel computer architecture is referred to as a multithreaded architecture (MTA). The MTA supports not only multiple processors but also multiple streams executing simultaneously in each processor. The processors of an MTA computer are interconnected via an interconnection network. Each processor can communicate with every other processor through the interconnection network. FIG. 1 provides a high-level overview of an MTA computer system 100. Each processor 101 is connected to the interconnection network and memory 102. Each processor contains a complete set of registers 101a for each stream such that the register values at any given time indicate the current stream state. In addition, each processor also supports multiple protection domains, each with counters reflecting the current protection domain state 101b, so that multiple user programs can be executing simultaneously within that processor. Each processor may also have processor-specific counters reflecting the current processor state 101c. The computer system also includes various input devices 105, a display device 110, and a permanent storage device 120.

Each MTA processor can execute multiple threads of execution simultaneously. Each thread of execution executes on one of the 128 streams supported by an MTA processor. Every clock cycle, the processor selects a stream that is ready to execute and allows it to issue its next instruction. Instruction interpretation is pipelined by the processor, the network, and the memory. Thus, a new instruction from a different stream may be issued in each cycle time period without interfering with other instructions that are in the pipeline. When an instruction finishes, the stream to which it belongs becomes ready to execute the next instruction. Each instruction may contain up to three operations (i.e., a memory reference operation, an arithmetic operation, and a control operation) that are executed simultaneously.

The state of a stream includes one 64-bit Stream Status Word ("SSW"), 32 64-bit General Registers ("R0–R31"), and eight 32-bit Target Registers ("T0–T7"). Each MTA processor has 128 sets of SSWs, of general registers, and of target registers. Thus, the state of each stream is immediately accessible by the processor without the need to reload registers when an instruction of a stream is to is be executed.

The MTA uses program addresses that are 32 bits long. The lower half of an SSW contains the program counter ("PC") for the stream. The upper half of the SSW contains various mode flags (e.g., floating point rounding, lookahead disable), a trap disable mask (e.g., data alignment and floating point overflow), and the four most recently generated condition codes. The 32 general registers are available for general-purpose computations. Register R0 is special, however, in that it always contains a 0. The loading of register R0 has no effect on its contents. The instruction set of the MTA processor uses the eight target registers as branch targets. However, most control transfer operations only use the low 32 bits to determine a new PC. One target register (T0) points to the trap handler, which may be an unprivileged routine. When the trap handler is invoked, the trapping stream starts executing instructions at the program location indicated by register T0. Trap handling is thus lightweight and independent of the operating system ("OS") and other streams, allowing the processing of traps to occur without OS interaction.

Each MTA processor supports as many as 16 active protection domains that define the program memory, data memory, and number of streams allocated to the computations using that processor. The operating system typically executes in one of the domains, and one or more user programs can execute in the other domains. Each executing stream is assigned to a protection domain, but which domain (or which processor, for that matter) need not be known by the user program. Each task (i.e., an executing user program) may have one or more threads simultaneously executing on streams assigned to a protection domain in which the task is executing.

The MTA divides memory into program memory, which contains the instructions that form the program, and data memory, which contains the data of the program. The MTA uses a program mapping system and a data mapping system to map addresses used by the program to physical addresses in memory. The mapping systems use a program page map and a data segment map. The entries of the data segment map and program page map specify the location of the segment in physical memory along with the level of privilege needed to access the segment.

The number of streams available to a program is regulated by three quantities slim, scur, and sres associated with each protection domain. The current numbers of streams executing in the protection domain is indicated by scur; it is incremented when a stream is created and decremented when a stream quits. A create can only succeed when the incremented scur does not exceed sres, the number of streams reserved in the protection domain. The operations for creating, quitting, and reserving streams are unprivileged. Several streams can be reserved simultaneously. The stream limit slim is an operating system limit on the number of streams the protection domain can reserve.

When a stream executes a CREATE operation to create a new stream, the operation increments scur, initializes the SSW for the new stream based on the SSW of the creating stream and an offset in the CREATE operation, loads register (T0), and loads three registers of the new stream from general purpose registers of the creating stream. The MTA processor can then start executing the newly created stream. A QUIT operation terminates the stream that executes it and decrements both sres and scur. A QUIT_PRESERVE operation only decrements scur, which gives up a stream without surrendering its reservation.

The MTA supports four levels of privilege: user, supervisor, kernel, and IPL. The IPL level is the highest privilege level. All levels use the program page and data segment maps for address translation, and represent increasing levels of privilege. The data segment map entries define the minimum levels needed to read and write each segment, and the program page map entries define the exact level needed to execute from each page. Each stream in a protection domain may be executing at a different privileged level.

Two operations are provided to allow an executing stream to change its privilege level. A "LEVEL_ENTER lev"

operation sets the current privilege level to the program page map level if the current level is equal to lev. The LEVEL_ENTER operation is located at every entry point that can accept a call from a different privilege level. A trap occurs if the current level is not equal to lev. The "LEVEL_RETURN lev" operation is used to return to the original privilege level. A trap occurs if lev is greater than the current privilege level.

An exception is an unexpected condition raised by an event that occurs in a user program, the operating system, or the hardware. These unexpected conditions include various floating point conditions (e.g., divide by zero), the execution of a privileged operation by a non-privileged stream, and the failure of a stream create operation. Each stream has an exception register. When an exception is detected, then a bit in the exception register corresponding to that exception is set. If a trap for that exception is enabled, then control is transferred to the trap handler whose address is stored in register T0. If the trap is currently disabled, then control is transferred to the trap handler when the trap is eventually enabled, assuming that the bit is still set in the exception register. The operating system can execute an operation to raise a domain_signal exception in all streams of a protection domain. If the trap for the domain_signal is enabled, then each stream will transfer control to its trap handler.

Each memory location in an MTA computer has four access state bits in addition to a 64-bit value. These access state bits allow the hardware to implement several useful modifications to the usual semantics of memory reference. These access state bits are two data trap bits, one full/empty bit, and one forward bit. The two data trap bits allow for application-specific lightweight traps, the forward bit implements invisible indirect addressing, and the full/empty bit is used for lightweight synchronization. The behavior of these access state bits can be overridden by a corresponding set of bits in the pointer value used to access the memory. The two data trap bits in the access state are independent of each other and are available for use, for example, by a language implementer. If a trap bit is set in a memory location, then an exception will be raised whenever that location is accessed if the trap bit is not disabled in the pointer. If the corresponding trap bit in the pointer is not disabled, then a trap will occur.

The forward bit implements a kind of "invisible indirection." Unlike normal indirection, forwarding is controlled by both the pointer and the location pointed to. If the forward bit is set in the memory location and forwarding is not disabled in the pointer, the value found in the location is interpreted as a pointer to the target of the memory reference rather than the target itself. Dereferencing continues until either the pointer found in the memory location disables forwarding or the addressed location has its forward bit cleared.

The full/empty bit supports synchronization behavior of memory references. The chronization behavior can be controlled by the full/empty control bit of a pointer or of a load or store operation. The four values for the full/empty control bits are shown below.

| VALUE | MODE | LOAD | STORE |
|---|---|---|---|
| 0 | normal | read regardless | write regardless and set full |
| 1 | | reserved | reserved |
| 2 | future | wait for full and leave full | wait for full and leave full |
| 3 | sync | wait for full and set empty | wait for empty and set full |

When the access control mode (i.e., synchronization mode) is future, loads and stores wait for the full/empty bit of the memory location to be accessed to be set to full before the memory location can be accessed. When the access control mode is sync, loads are treated as "consume" operations and stores are treated as "produce" operations. A load waits for the full/empty bit to be set to full and then sets the full/empty bit to empty as it reads, and a store waits for the full/empty bit to be set to empty and then sets the full/empty bit to full as it writes. A forwarded location (i.e., its forward bit is set) that is not disabled (i.e., by the access control of a pointer) and that is empty (i.e., full/empty bit is set to empty) is treated as "unavailable" until its full/empty is set to full, irrespective of access control.

The full/empty bit may be used to implement arbitrary indivisible memory operations. The MTA also provides a single operation that support extremely brief mutual exclusion during "integer add to memory." The FETCH ADD operation loads the value from a memory location, returns the loaded value as the result of the operation, and stores the sum of that value and another value back into the memory location.

Each protection domain has a retry limit that specifies how many times a memory access can fail in testing full/empty bit before a data blocked exception is raised. If the trap for the data blocked exception is enabled, then a trap occurs. The trap handler can determine whether to continue to retry the memory access or to perform some other action. If the trap is not enabled, then the next instruction after the instruction that caused the data blocked exception is executed.

A speculative load occurs typically when a compiler generates code to issue a load operation for a data value before it is known whether the data value will actually be accessed by the program. The use of speculative loads helps reduce the memory latency that would result if the load operation was only issued when it was known for sure whether the program actually was going to access the data value. Because a load is speculative in the sense that the data value may not actually be is needed by the program, it is possible that a speculative load will load a data value that the program does not actually use. The following statements indicate program statement for which a compiler may generate a speculative load:

if i<N
      x=buffer[i]
    endif

The following statement illustrates the speculative load that is placed before the "if" statement.

r=buffer[i]
    if i<N
      x=r
    endif

The compiler has generated code to load the data value for buffer[i] into a general register "r" and placed it before the code generated for the "if" statement condition The load of the data value could cause an exception, such as if the index i was so large that an invalid memory location was being accessed. However, the necessity of this exception is uncertain at that time since the invalid memory location will not be accessed by the original code unless the "if" statement condition is satisfied (i.e., i<N). Even if the "if" statement condition is satisfied, the exception would not have occurred until a later time. To prevent a speculative load from causing an incorrect exception to occur or occur too early, the MTA has a "poison" bit for each general register. Whenever a load occurs, the poison bit is set or cleared depending on whether an exception would have been raised. If the data in a general register is then used while the corresponding poison bit is set, then an exception is raised at the time of use. In the above example, the "r-buffer[i]" statement would not raise an exception, but would set the corresponding poison bit if the address is invalid. An exception, however, would be raised when the "x=r" statement is executed accessing that general register because its poison bit is set. The deferring of the exceptions and setting of the poison bits can be disabled by a speculative load flag in the SSW.

The upper 32-bits of the 64-bit exception register contain the exception flags, and the lower 32 bits contain the poison bits. Bits 40–44 contain the flags for the user exceptions, which include a create stream exception, a privileged instruction exception, a data alignment exception, and a data blocked exception. A data blocked exception is raised when a data memory retry exception, a trap 0 exception, or a trap 1 exception is generated. The routine that is handling a data blocked exception is responsible for determining the cause of the data blocked exception. The exception register contains one poison bit for each of the 32 general registers. If the poison bit is set, then an attempt to access the content of the corresponding register will raise an exception.

The lower 32 bits of the 64-bit SSW contain the PC, bits 32–35 contain mode bits, bits 40–51 contain a trap mask, and bits 52–63 contain the condition codes of the last four instructions executed. Bit 37 within the mode bits indicates whether speculative loads are enabled or disabled. Bit 48 within the trap mask indicates whether a trap on a user exception is enabled (corresponding to bits 40–44 of the exception register). Thus, traps for the user exceptions are enabled or disabled as a group.

Each word of memory contains a 64-bit value and a 4-bit access state. The 4-bit access state is described above. When the 64-bit value is used to point to a location in memory, it is referred to as a "pointer." The lower 48 bits of the pointer contains the address of the memory location to be accessed, and the upper 16 bits of the pointer contain access control bits. The access control bits indicate how to process the access state bits of the addressed memory location. One forward disable bit indicates whether forwarding is disabled, two full/empty control bits indicate the synchronization mode; and four trap 0 and 1 disable bits indicate whether traps are disabled for stores and loads, separately. If the forward disable bit is set, then no forwarding occurs regardless of the setting of the forward enable bit in the access state of the addressed memory location. If the trap 1 store disable bit is set, then a trap will not occur on a store operation, regardless of the setting of the trap 1 enable bit of the access state of the addressed memory location. The trap 1 load disable, trap 0 store disable, and trap 0 load disable bits operate in an analogous manner. Certain operations include a 5-bit access control operation field that supersedes the access control field of a pointer. The 5-bit access control field of an operation includes a forward disable bit, two full/empty control bits, a trap 1 disable bit, and a trap 0 disable bit. The bits effect the same behavior as described for the access control pointer field, except that each trap disable bit disables or enables traps on any access and does not distinguish load operations from store operations.

When a memory operation fails (e.g., a synchronized access failure), an MTA processor saves the state of the operation. A trap handler can access that state. That memory operation can be redone by executing a redo operation (i.e., DATA_OP_REDO) passing the saved state as parameters of the operation. After the memory operation is redone (assuming it does not fail again), the trapping stream can continue its execution at the instruction after the trapping instruction.

The appendix contains the "Principles of Operation" of the MTA, which provides a more detailed description of the MTA.

While the use of a multithreaded architecture provides various benefits, the architecture also adds various complexities to conducting performance analysis of executing tasks. Such performance analysis attempts to quantify various performance measures that indicate how efficiently computer system resources are utilized during execution (e.g., processor utilization) as well as other measures related to the execution (e.g., memory latency, total execution time, or the number and rate of executed FLOPS, memory references, or invocations of a particular function).

When a task executes on a multithreaded architecture, a variety of additional parallelism performance measures are available to be measured and tracked. For example, it may be of interest to have information related to the threads for the task, such as the number of task threads executing, the number of task threads blocked, the number of task threads ready and waiting to be executed, and the number of threads contending for a lock. Similarly, it may be of interest to track information related to the one or more protection domains in which the task is executing (e.g., the total number of instructions issued in each protection domain), to the streams allocated to the one or more protection domains (e.g., the number of streams allocated to the protection domain), and to the one or more processors executing the task (e.g., the number of streams ready to be executed at each cycle). In addition, parallelism information about which regions of the task source code were parallelized (i.e., executed by different simultaneously executing threads) during execution and the degree of parallelism (i.e., how many different threads were simultaneously executing in how many different protection domains) for those regions may be of interest.

Various techniques have been used to assist in performance analysis. One such technique, referred to as profiling, attempts to determine how many times each source code statement is executed. Such information allows user attention to be directed to manually optimizing the portions of the source code that are most often executed. However, such analysis is typically concerned only with minimizing the total execution time of the task, and does not address any of the performance analysis issues related specifically to multithreaded architectures and parallelism.

Another technique useful for performance analysis involves generating during execution of the task various execution trace information that is related to different performance measures, referred to as tracing the task or as tracing the source code for the task. One method of generating such trace information is to have instructions in the source code that when executed will output information to a trace information file. This trace information file can then be examined after execution of the task has completed. For example, to estimate the amount of time spent executing a function, instructions before and after invocations of the function can write out the current time to the trace information file.

One factor complicating performance analysis is that many computer systems do not directly provide information about many types of performance measures, such as the number of phantoms for a processor (i.e., a hole in the instruction pipeline such that an instruction is not executed during a processor cycle) or the number of memory references that occur. It is even less likely for computer systems to directly provide execution information about parallelism performance measures such as parallelized regions and the degree of parallelism. Thus, generating accurate performance measure information is problematic, particularly, with respect to parallelism such as that present on multi-threaded architectures.

SUMMARY OF THE INVENTION

Some embodiments of the present invention provide a method and system for conducting performance analysis for task execution. The analysis involves generating a variety of trace information related to performance measures, including parallelism-related information, during execution of the task. In order to generate the trace information, target source code of interest is compiled in such a manner that executing the resulting executable code will generate execution trace information composed of a series of events. Each event stores trace information related to a variety of performance measures for the one or more processors and protection domains used. After the execution trace information has been generated, the system can use that trace information and a trace information description file to produce useful performance measure information. The trace information description file contains information that describes the types of execution events as well as the structure of the stored information. The system uses the trace information description file to organize the information in the trace information file, extracts a variety of types of performance measure information from the organized trace information, and formats the extracted information for display. The system can use default or user-defined functions to extract and format trace information for display. After the system displays one or more types of performance measure information, a user of the system can then interact with the system in a variety of ways to obtain other useful performance analysis information.

BRIEF DESCRIPTION OF THE DRAWINGS

FIGS. 4A, 4B, and 4C illustrate examples of a Trace Information Description File, an Execution Trace Information File, and a Trace Information Display Functions File respectively.

FIGS. 5A–5I are example user interface screens displaying various parallelism performance analysis data.

DETAILED DESCRIPTION OF THE INVENTION

Figure 1:
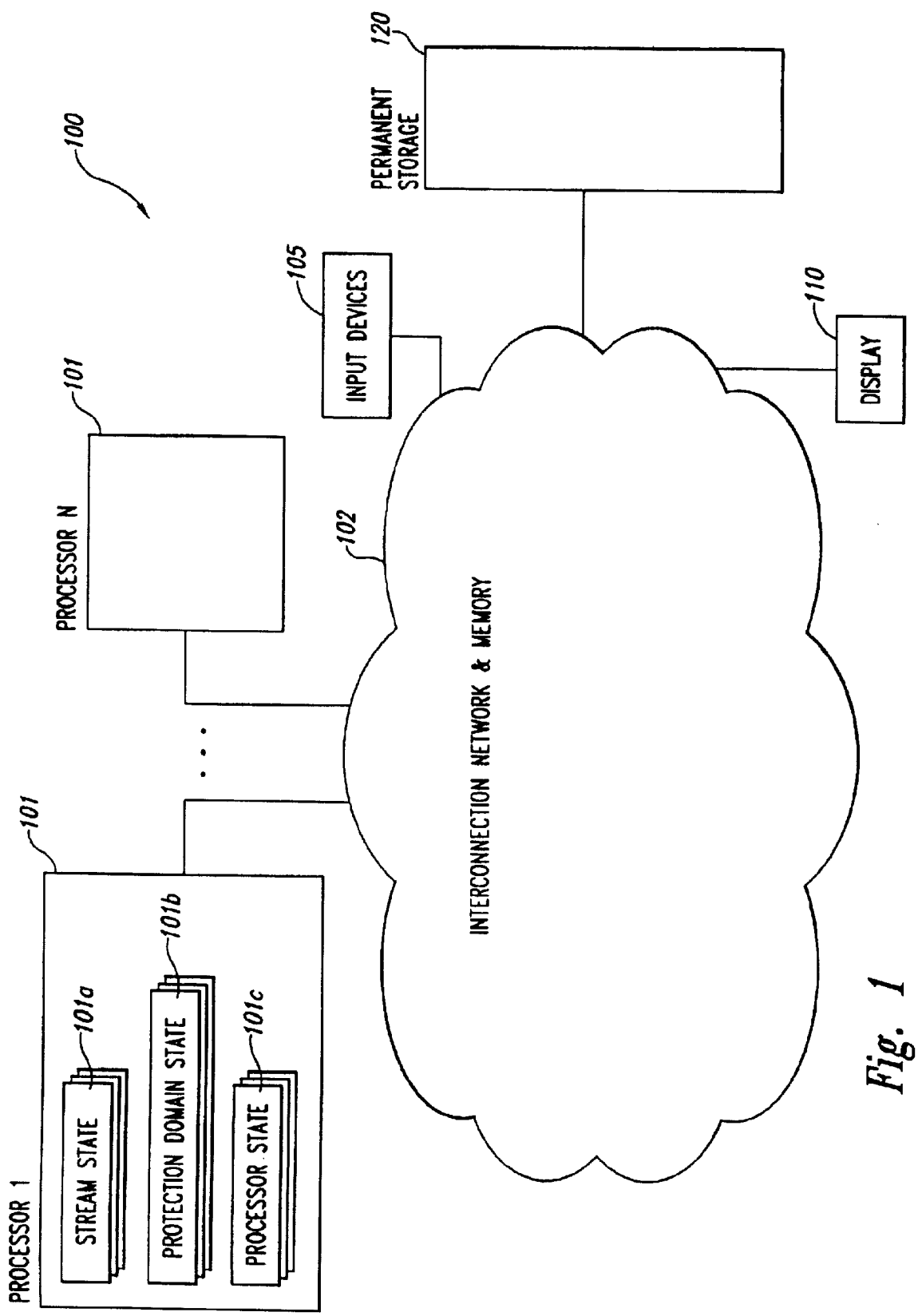
FIG. 1 provides a high-level overview of an MTA computer, with each processor 101 connected to the interconnection network and memory 102.

An embodiment of the present invention provides a method and system for conducting performance analysis for executing tasks. The analysis is made possible by generating a variety of performance measure information, including parallelism-related information, during execution of the task. In particular, target source code of interest is compiled in such a manner that executing the resulting target executable code will generate execution trace information related to a variety of performance measures for the one or more processors and protection domains used. The compiler will add a variety of instructions to the code such that execution of the added instructions will generate the trace information, including using any hardware-supported mechanisms (e.g., counters and registers) for retrieving trace information.

After the execution trace information has been generated, the Trace Information Displayer (TID) system can use that trace information, along with a trace information description file, to produce useful performance measure information. The trace information description file contains information that describes the types of execution events that store trace information (e.g., an entry point into a function or the beginning of a parallelized region) as well as the structure of the information that will be stored for such events (e.g., the first 4 bytes are the value of hardware counter X, the next 4 bytes are the ID for the thread that generated the event, etc.). This description information allows the TID system to assign conceptual meaning to the raw trace information, and to extract performance measure information of interest.

After the TID system uses the trace information description file to define the types of information present in the trace information file, the system divides the raw trace information into groups corresponding to the events (e.g., an event indicating an entry point into a particular function) and assigns meaning to the raw trace information generated for each such event (e.g., the first 8 bytes of this event hold the name of the particular function). The TID system can also organize the trace information, such as by ensuring that the events are in chronological order (e.g., to adjust for some event trace information being buffered longer than other event trace information before being written to a trace information file).

The TID system next extracts a variety of types of performance measure information from the organized trace information, and formats the extracted information for display. For example, it may be of interest to graph the increasing, values over the course of the task execution for a particular cumulative hardware counter, or to instead graph the corresponding rate of change for the cumulative counter. In either case, the TID system may produce a series of X-Y points for the hardware counter value, using time (or processor clock cycles) for the X axis and using the value of the counter for the Y axis. The TID system can use default or user-defined functions to extract and format trace information for display.

After the TID system displays one or more types of performance measure information, a user of the system can then interact with the system in a variety of ways to obtain other useful performance analysis information. For example, the user can select a displayed point corresponding to an event, and have the TID system display the raw trace data for the event. Alternately, the TID system can annotate one or more displayed events with relevant information, such as the name of the corresponding source code function being executed. The TID system can also map trace information events back to the source code that was executing when the event occurred, and can display the corresponding source code to the user. The displayed source code can graphically illustrate parallelism information such as regions of the source code that were automatically parallelized by the compiler as well as the reason the compiler was unable to parallelize other regions.

In addition to providing event definitions which enable conceptual meaning to be assigned to the raw trace information, the trace information description file can also provide a variety of other types of information for the defined events. For example, the trace information description file can specify print formats and tabular display formats for each event type to be used when printing or displaying the raw data for an event of that type. In addition, the trace information description file can indicate relationships between different types of generated trace information to indicate that some trace information may be related to other trace information. For example, information that is common to multiple events may be stored in the trace information file separately from those events (to avoid the need to replicate the same information a number of times), and those events may reference the separately stored common information.

Figure 2:
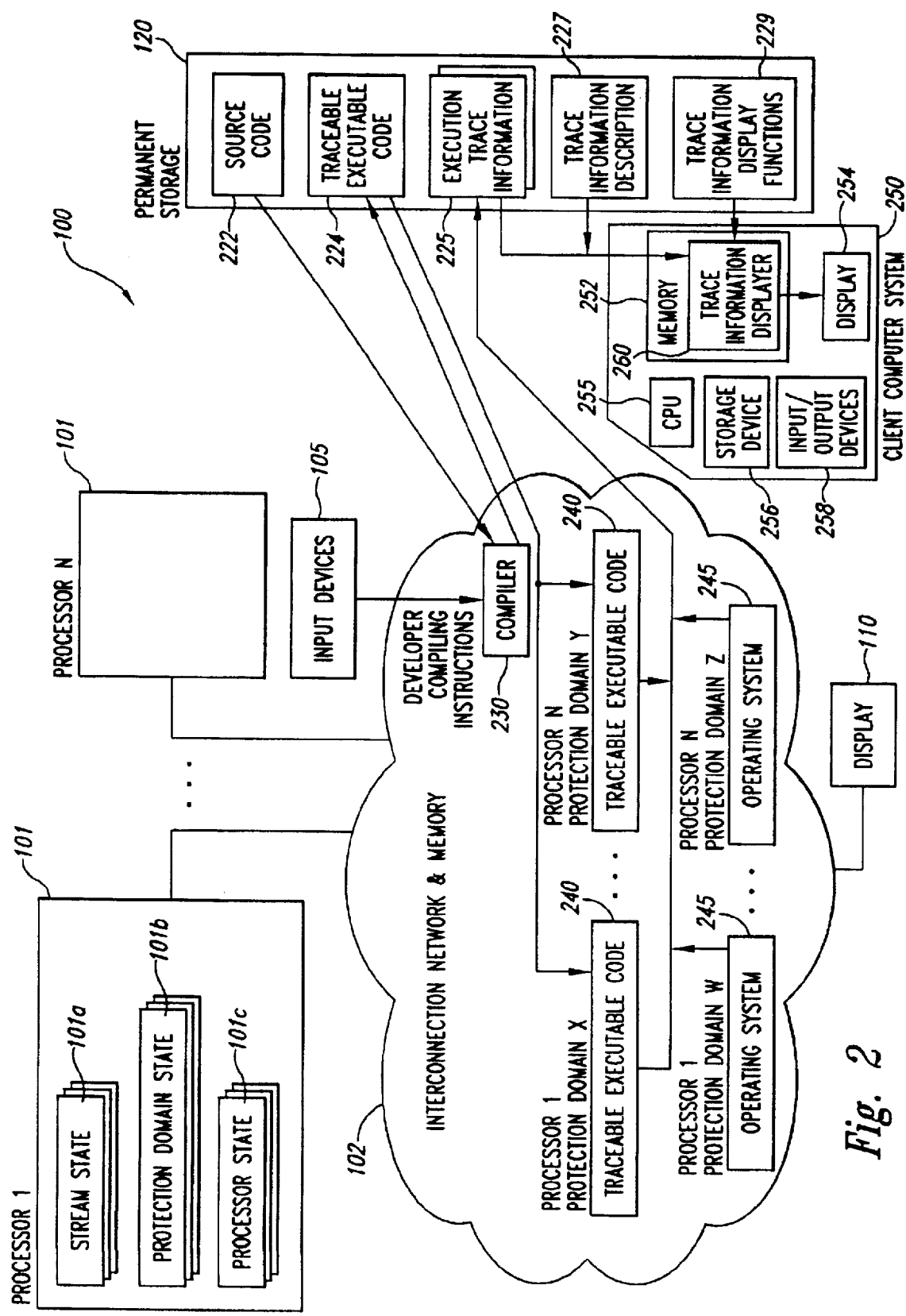
FIG. 2 illustrates an embodiment of the system of the present invention for generating and displaying execution performance measure information.

FIG. 2 illustrates a computer system 100 suitable for generating execution trace information for an executing task, and a client computer system 250 suitable for executing the TID system so as to generate and display performance measure information from the execution trace information. In the illustrated embodiment, a software developer has created the source code file 222 stored on the permanent storage device 120 of the computer system 100, and wishes to conduct performance analysis for the execution of the source code. In order to conduct performance analysis using the technique of the present invention, an executable version of the source code is generated that will produce appropriate trace information when executed. Those skilled in the art will appreciate that in alternate embodiments, a single computer system can be used to both generate execution trace information and to generate and display resulting performance measure information. In addition, those skilled in the art will appreciate that source code can be created in a variety of ways, such as via a basic text editor or via one of a variety of application development environments.

In order for the executing code to generate trace information, a variety of sample points will be added at various locations of interest in the source code. Each sample point will be of a specified type designed to sample the current values of a particular set of performance measure values. The sample points can be added to the source code in a variety of ways. For example, the developer can manually insert a sample point at any location of interest in the source code by adding an appropriate compiler directive. When the source code is compiled, the compiler directive will instruct the compiler to add the appropriate code for the sample point at that location.

In addition to any manually specified sample points, the compiler can also insert a variety of types of sample points automatically. For example, tracking when a function is entered or exited is often of interest, so the compiler can automatically add a sample point at the beginning of each function indicating the entry and at the end of each function indicating the exit. Alternately, only certain functions of interest may have sample points added, such as the top-level function (e.g., 'main' for the C language) or all functions that contain at least a specified minimum number of source code statements.

In addition, compilers for multithreaded architectures will often attempt to identify and mark regions of code that can be parallelized. For example, a region of code that loops multiple times with sequential values of a variable (e.g., 'loop for x from 1 to 10') may be able to be divided among multiple processors so that each instance of the loop (with a different value of the variable) can be executed by a different thread simultaneously. After the compiler has identified parallelizable regions, the compiler can add appropriate sample points at locations of interest within the parallelizable regions, such as at the beginning of the region (i.e., the fork), at the end of the region (i.e., the join), and at any sections which serve as synchronization points such that multiple threads executing the code will wait at the synchronization point for other threads to reach the same point (i.e., barriers).

Thus, when the developer wishes to create a traceable version of the executable code that generates trace information corresponding to a variety of sample points, the developer supplies the source code file 222 to the compiler 230 executing in memory 102 and indicates a trace option to the compiler to instruct the compiler to generate traceable executable code. The developer can also supply to the compiler a variety of other compiling instructions via one or more input devices 105. These other compiling instructions can instruct the compiler as to the types of sample points to be added (e.g., function entry and exit sample points, but not parallelizable region sample points) as well as indications of particular portions of interest in the source code (e.g., only functions with at least 50 statements).

After receiving the source code and any compiling instructions, the compiler generates the traceable executable code file 224 stored on the permanent storage. In the illustrated embodiment, the various sample points are implemented by having the compiler add appropriate instructions to the source code at each sample point location before the source code is compiled. When executed, these added instructions will determine the hardware-related and software-related values of interest, and will write an event containing those values to an execution trace information file. Thus, each event in the execution trace information file will be of a specified type that corresponds to the sample point that creates the event. As described previously, in the illustrated embodiment a trace information description file describes the types of execution events and their corresponding structure. Those skilled in the art will appreciate that in some embodiments the definitions of the events from the trace information description file merely reflect pre-defined event types that are provided by the compiler, while in other embodiments the compiler can use the information in the trace information description file to define the possible event types and to determine the appropriate instructions to be added to generate such events.

Those skilled in the art will appreciate that the instructions could alternately be added after the source code had been compiled, and that the added instructions could produce trace information other than by writing the information to a file (e.g., by supplying the information to another process via inter-process communication). In addition, those skilled in the art will appreciate that the compiler will, at compile time, have access to a variety of information which can be specified in the instructions added to the source code, such as the symbolic names of functions and variables related to the added instructions. In addition, the compiler can add information to the generated executable code to assist in creating a mapping between the compiled instructions and their corresponding source code. This mapping can assist in determining the source code that corresponds to a particular value of the PC during execution.

Those skilled in the art will also appreciate that the instructions added for a single sample point may create multiple events if the source code corresponding to the sample point is executed multiple times (e.g., if it is within an invokable function or within a loop). In such situations, some of the information for the multiple events may be common to all of the events, such as static information that does not change for different executions of the sample point (e.g., the name of the function in which the sample point is located and the PC corresponding to the sample point). In other situations, events that are generated from different sample points may also share common information.

In some embodiments, such common information is redundantly generated for each such event and is separately written to the execution trace information file. In alternate embodiments, the common information is written to the execution trace information file separately from the specific events, and thus need be written only once. Each such group of separately stored common information is referred to as a descriptor object, and is referred to by the various events which share the information. In these embodiments, the descriptor objects are treated as if they are part of the structure of the various events. When the common information is written to the execution trace information file separately from the specific events, the instructions added by the compiler at each sample point generate the event-specific information that is not common to multiple events.

Thus, other instructions must be added to the executable code to generate the descriptor objects. Moreover, it is useful if the descriptor objects are stored earlier in the execution trace information file than the event-specific information, so that when a event-specific reference to a descriptor object is located, the TID system can immediately calculate the offset from the reference to the earlier descriptor object to facilitate retrieving information from the descriptor object for the event. The compiler therefore additionally generates a series of instructions corresponding to each set of common information, and adds those series of instructions to the source code before the source code corresponding to the initial execution of the top-level function. Those instructions will be executed before any event-specific instructions within the source code, and the common information will thus be present at the beginning of the trace information file. After the compiler has added the various appropriate instructions for the sample points, the compiler then compiles the source code with the added instructions in the normal manner.

In the illustrated embodiment, each processor 101 has multiple protection domains 240 in which different processes can simultaneously execute, and a process executing in a protection domain can have multiple threads simultaneously executing on multiple streams assigned to the protection domain. If the compiler identified at least one parallelizable region for the traceable executable code file, then portions of the traceable executable code can be loaded into multiple protection domains on different processors when the code is executed. If so, the traceable executable code will execute as a task spread across multiple protection domains. Each group of threads for a process in a protection domain is referred to as a team, with the executing task thus capable of being composed of teams of is threads executing in multiple protection domains on multiple processors.

When an executing thread executes the instructions added for a sample point, the execution of the instructions will cause an event to be added to an execution trace information file. As previously described, each event can consist of multiple pieces of trace information of a variety of types. In the illustrated embodiment, the trace information for each event is written out atomically such that all trace information for an event will be added to the execution trace information before trace information for another event is added. Those skilled in the art will appreciate that this can be accomplished in a variety of ways, such as buffering output trace information before it is written to the file and waiting to write the buffer until all trace information for each event in the buffer is available. Thus, as the traceable executable code file 224 executes in the multiple protection domains 240, corresponding event information is written to the execution trace information file 225 on the permanent storage. An exemplary execution trace information file is discussed in greater detail with respect to FIG. 4A.

In addition to the trace information produced by the execution of the traceable executable code, it is also possible for other executing processes or tasks to generate execution trace information related to the execution of the traceable executable code. For example, the operating system for one or more of the processors may have information relevant to the parallelism performance analysis of the traceable executable code that is not available to the traceable executable code itself. For example, creating additional threads for an executing process, swapping a process in and out of a protection domain, or changing the security level for a process may all be occurrences of interest. In some embodiments, the user-level traceable executable code may perform some or all of these activities directly, and if so can have sample points to record trace information related to those occurrences. In alternative embodiments, the operating system may perform some or all of these types of tasks, and if so the operating system can add corresponding trace information to the execution trace information file 225 at the time of these occurrences. In the illustrated embodiment, a protection domain 245 on each processor is devoted to providing operating system functionality to other processes executing on the processor.

It is also possible for processes other than the operating system to generate execution trace information for the traceable executable code. For example, it may be desirable to ensure that trace information is generated for the traceable executable code at regular time intervals (e.g., every 256 cycles). However, the execution time required for various portions of the traceable executable code can be unpredictable, so merely adding sample points to the traceable executable code may not be sufficient to ensure that the trace information is generated at the desired regular intervals. Instead, it is possible to create a background daemon that executes as a thread (not shown) and that monitors the protection domains 240 in which the task is executing. Such a daemon can periodically sample values of relevant performance measures and write a corresponding event to the execution trace information file 225.

After the execution trace information file 225 has been created, the trace information can be analyzed and displayed to the developer or another user to provide feedback related to the performance of the task execution. The TID system performs this analysis and provides an interactive interface which can display a variety of types of information to the developer. Thus, in the illustrated embodiment the execution trace information file 225 and the trace information description file 227 are supplied to the TID system 260 executing in memory 252 of the client computer system 250.

The TID system first uses the trace information description file 227 to define the types of events which may be present in the execution trace information file. Those skilled in the art will appreciate that a variety of other alternate mechanisms are available to provide such information to the TID system, such as explicitly adding such information to each event in the execution trace information file (e.g., with a header) or by hard-coding the types of events and their structures in the TID system. If event descriptor objects are present in the trace information file, the events referencing the objects are also mapped to their corresponding objects. An exemplary trace information description file is discussed in greater detail with respect to FIG. 4B.

In order to provide more useful execution trace information, the TID system also performs a variety of normalization operations to ensure that the values for a particular performance measure are consistent with each other. For example, if hardware counters values are included in the trace information, such counters often begin incrementing upon the boot of the processor. Thus, the counters may already have large values when execution of the task begins. The TID system therefore normalizes all such counter values so that the beginning of the task execution corresponds to a value of zero, by subtracting the value of each counter at the beginning of the task execution from all later values for that counter. In addition, many counters will continue to increment even during periods when the task is not executing, such as when the task is swapped out of the protection domain (e.g., a counter of the number of instructions issued in the protection domain). Thus, the TID system normalizes such counter values so that they reflect only the execution of the task. Another normalization situation arises when information from multiple protection domains is present in the trace information file and when the information to be extracted for each event requires the current values of the hardware counters for all protection domains. Thus, if an event that occurred at one time in one protection domain does not have corresponding events from the other protection domains at the same time, the values for the hardware-supported counters in those other protection domains will be estimated based on available events for those protection domains.

After the execution trace information is analyzed by the TID system, the system can extract a variety of types of performance measure information and format the extracted information in an appropriate manner for display. In order to determine appropriate information to extract, the system uses one or more display functions which define the types of event information to extract from the raw trace information. Exemplary trace information display functions are discussed in greater detail with respect to FIG. 4C.

In the illustrated embodiment, the TID system can optionally receive a set of user-defined trace information display functions 229 that are stored on the permanent storage. If such display functions are received, they will be used to extract the information that will be initially displayed by the TID system. Alternately, if user-defined trace information display functions are not supplied, default display functions can be used. After the information of interest has been, extracted and formatted for display, the information is graphically displayed on the display 254 of the client computer system 250. The developer or another user can then use the input/output devices 258 to interact with the TID system and to supply requests to modify the display and to display alternate types of information.

In the illustrated embodiment, the user of the TID system can request that a variety of types of trace information be displayed. For example, time-based graphs of counter values over the period of task execution or of the rate of change of such counters over the period may be displayed. The user can also request to see raw data for a selected event, to print a displayed graph or the trace information corresponding to a selected event, to redefine the origin of the x-axis for a displayed graph, to do source mapping for a selected event and show the source code executing when the event occurred, and to automatically add annotations related to events such as the names of functions corresponding to displayed sets of events.

Those skilled in the art will appreciate that the displayed computer systems are merely illustrative and are not intended to limit the scope of the present invention. The computer systems may contain additional components or may lack some illustrated components. For example, the TID system could execute without the use of the client computer system 250 by having the TID system execute in memory 102 and display results on display 110. Alternately, components currently shown as executing in memory 102 could instead execute on the client computer system 250, such as the compiler 230. Parallelism performance analysis can also be performed when the traceable executable code file executes in a single protection domain on a single processor if the task uses multiple streams and multiple threads within that protection domain. In addition, information could be provided to the client computer system 250 in a variety of ways other than from files on permanent, storage 120, such as via inter-process communication. Accordingly, the present invention may be practiced with other computer system configurations.

Figure 3:
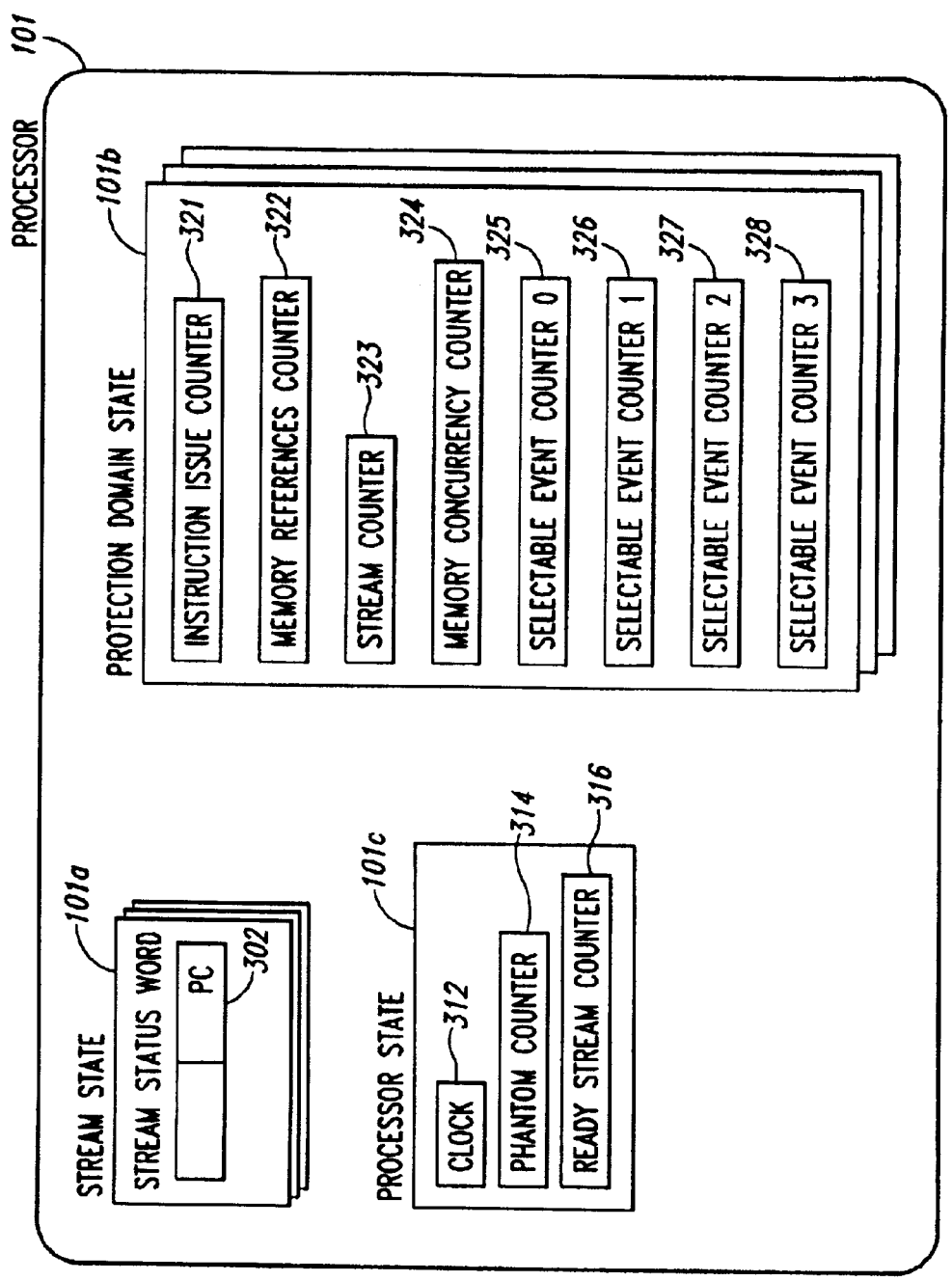
FIG. 3 is a block diagram illustrating hardware support for gathering performance measure information for each processor on which a task is executing.

FIG. 3 is a block diagram illustrating an embodiment of hardware components related to a processor on which a program to be traced is executing. In the illustrated embodiment, each processor provides hardware support to record a variety of types of execution information of interest, and to provide that information to an executing program. Thus, the instructions added to the traceable executable code can access current values for various hardware-supported information sources and can output that retrieved information as trace information.

In the illustrated embodiment, each processor 101 maintains a processor state 101c which includes a variety of current values related to the processor. The processor state includes a clock counter 312 that contains the current value of the clock (which is updated each cycle), a phantom counter 314 that records the number of phantoms that have occurred for the processor since some given start point (such as the last boot of the computer system), and a ready stream counter 316 that sums the total number of streams ready to be executed at each cycle of the processor. The values for each of the counters can be stored in a variety of ways, such as by dedicating a separate 64-bit counter for each value. In the illustrated embodiment, when multiple processors are being used the clocks on all processors are synchronized so that they agree in value. User-level instructions can be provided so that the traceable executable code can access the current values in any of the processor state counters.

Various information is also maintained for each stream in a stream state 101a for that stream. As previously described, one such type of stream information includes a stream status word 302 for each stream, with the lower 32 nits of the word containing the current value of the PC for that stream. In some embodiments, the sample point instructions or descriptor object instructions added to the traceable executable code can retrieve the current value of the PC from the stream status word for the stream executing a thread, and use that value of the PC to perform source mapping and determine a portion of the source code being executed. In alternate embodiments, such as when the compiler and/or linker knows a pre-defined memory location where the traceable executable code will be loaded, the compiler can pre-determine what the PC will be for instructions that are being added, and thus the added instructions need not determine the current value of the PC when they are executed. In still other embodiments, instructions are added to the beginning of the source code that determine the PC for the beginning of the executable code, and that add the offset to the other code later in the executable code to determine the PC for that later code. As previously described, after the PC has been determined, the added instructions for a sample point can then write descriptor objects or events that include the PC corresponding to the sample point.

In addition to processor state and stream state, the illustrated embodiment includes hardware support for storing a variety of information about the protection domain state 101b for each protection domain on the processor. In the illustrated embodiment, eight 64-bit resource counters are provided for each protection domain state. These counters include an instruction issue counter 321 which increments when an instruction issues in the domain, a memory references counter 322 which counts the number of memory-related operations that are issued (i.e., Load, Store, Fetch_Add, and State), a stream counter 323 which is incremented by the number of streams currently allocated to the protection domain, and a memory concurrency counter 324 which is incremented by the number of memory operations in the protection domain that have issued but not yet completed.

In addition to the four pre-specified counters, each protection domain state also includes four selectable event counters 325–328. Each of the selectable event counters can be specified to count one of a variety of types of hardware events. In the illustrated embodiment the selectable events including the following:

the number of operations executed by the m-unit
the number of operations executed by the a-unit
the number of operations executed by the c-unit
the number of set operations for the target registers
the number of load operations issued
the number of store operations issued
the number of int_fetch_add operations issued
the number of memory operations retried, including forwarding
the number of float_add and float_sub operations
the number of float_add_mul operations
the number of float_div operations
the number of float_sqrt operations
the total number of floating-point operations
the number of expected jump or skip paths taken
the number of unexpected jump or skip paths taken
the sum of all transfer operations
the number of level_enter operations
the number of traps taken
the number of stream_create operations, and
the number of stream_quit operations.

In the illustrated embodiment, each of the eight counters are updated only periodically, such as every 256 cycles. Thus, for example, every 256 cycles the instruction issue counter will be incremented by the number of instructions that had issued in the domain since the previous update, thereby providing a total count of the number of instructions that have issued since some starting point such as when the processor was last booted. The other counters are updated in a similar manner. Thus, instructions added to the traceable executable code can retrieve and provide information stored in any or all of the counters for the processor state, the stream states, and the protection domain states.

FIGS. 4A, 4B, and 4C illustrate examples of a Trace Information Description File, an Execution Trace Information File, and a Trace Information Display Functions File respectively. Looking first at FIG. 4A, the example Trace Information Description File defines the various types of entries that may be stored in a corresponding execution trace information file, as well as the structure of the information stored for each entry. For example, the Description File indicates that the possible types of trace information entries are events (generated from the execution of a sample point), descriptor objects (containing information common to multiple events), and swap_out occurrences (when an executing portion of a task is swapped out a protection domain). The Description File also indicates that three types of sample point events can be generated, those being from entry and exit points for functions and from user-specified sample points. Those skilled in the art will appreciate that other types of trace information entries and of event types may be defined and generated.

After defining the types of entries, the Description File defines the structure for the entries. For example, descriptor objects will be composed of five pieces of information: a descriptor object ID so that the following pieces of information can be identified to be part of a descriptor object entry, a unique address so that events corresponding to the descriptor object can identify it, the value of the PC for the corresponding events, an indication of the type of the corresponding events, and a string holding the name of the function containing the sample point that generated the events. In the illustrated example, a descriptor object corresponds only to a single sample point (and all the events generated for the sample point). Each event entry analogously is defined to have nine pieces of information, those being an Event ID, the address of the descriptor object to which the event corresponds, IDs for the team and thread executing the sample point instructions that create the event, and values for five current hardware counters from the processor and protection domain executing the sample point instructions. Finally, swap_out entries store information similar to that of event entries, but record values for additional hardware counters not captured by events.

The event entry definition also demonstrates that information other than the structure of the entry can be defined. For example, the event entries have defined display and print formats that will be used if the raw information for an event is to be displayed in tabular format to a user or is to be printed. Those skilled in the art will appreciate that different types of events (e.g., user-specified events) could have more specific entry definitions that take precedence over the general event entry definition, allowing different structure to be defined for such events or a different display or print format to be defined.

When an execution trace information file is generated that corresponds to the definitions in the Description File, the Description File will be used to interpret the data in the trace information file. FIG. 4B shows an example Execution Trace Information File that corresponds to the Description File. Note that the data values are displayed using hexadecimal form, and that particularly data values are shown only for illustration purposes. When the Trace Information File is processed, the first piece of information ('80000002') will be analyzed. The Description File indicates that this is a descriptor object ID, and thus that the ID and the next four pieces of information are part of a descriptor object entry. The four pieces of information following the ID can thus be assigned meanings as the unique address of the descriptor object, the value of the PC for the corresponding events, an indication that the corresponding events are for a function_entry sample point, and the name of the function containing the sample point that generated the events. Continuing down through the Trace Information File, the next entry is also a descriptor object consisting of five pieces of information, this one corresponding to the function_exit sample point of the same function.

The ID for the next entry in the Trace Information File is 80000001, indicating that the entry is an event and thus that the next eight pieces of information will have assigned meanings. Note that the piece of information following the event ID indicates that the descriptor object which corresponds to the event is the first descriptor object (ie., the one with the address of A7). The next entry in the Trace Information File is also an event, and also corresponds to the same descriptor object as the previous event (thus indicating that in the illustrated embodiment the two events were generated from the same sample point). However, the team and thread IDs for the second event indicate that it was generated by a different processor and stream than the first event. Thus, the hardware counters in the second event will correspond to a different processor and protection domain than those of the first event.

The next entry in the Trace Information File is indicated by the ID to correspond to a swap_out entry, with the team ID indicating that the thread which generated the second event entry will be one of the threads swapped out. Note, for example, that while some of the hardware counters may have changed between the generation of the event and swap_out entries (e.g., the processor clock has changed from '0076' to '0082'), others may not (e.g., the value of the phantoms counter has remained unchanged at '001C'). Those skilled in the art will appreciate that a variety of additional entries will typically be present in an execution trace information file.

As previously described, after the Description File has been used to assign meaning to the various pieces of information in the Execution Trace Information File, various normalization tasks can be performed in order to make the trace information more useful. For example, if the first displayed event entry is the first entry for the task execution, the values of the various counters may be adjusted so that the normalized counter values are 0 for the beginning of the task execution. To do so, the value '0A32' would be subtracted from every event clock value, and the value '0092' would be subtracted from every value of the issue_counter for the protection domain executing thread 3C7 of team C. Similarly, if the team that generated the second event entry is later swapped back into the protection domain so that execution resumes, counter values generated after the swap_out may be adjusted so that occurrences in the protection domain for another task (e.g., increments to the issue_counter value) are not reflected as part of the trace information for the task of interest. Those skilled in the art will appreciate that other normalization actions may also be performed.

After the Execution Trace Information File has been analyzed using the Trace Information Description File, information of interest can be extracted and displayed from the Trace Information File. The exemplary Trace Information Display Functions File shown in FIG. 4C can be used to extract and display such information. As shown, the Display Functions File defines four types of information that can be extracted and displayed, as well as showing two example display commands. As is shown, in the illustrated example information is extracted from the Trace Information File by specifying information fields which may be present in one or more types of entries (e.g., in both event and swap_out entries). Thus, for example, asking for 'phantoms' will extract the values '0028' when the clock is 'OA32,' '001C' when the clock is '0076,' and '001C' when the clock is '0082' (from the two event entries and the one swap_out entry). These pairs of values could then be graphed on a 2-D graph, such as with time (clock values) along the x-axis and the value of the phantom counter along the y-axis. Information from different processors or protection domains can be handled in a variety of ways, such as displaying the data for each processor separately or instead aggregating the values from all processors together at each clock value. Note that in the illustrated embodiment, extracted information values can be processed before display (e.g., the 'rate' function will calculate how much the counter value changes over a specified period of time such as 256 cycles), and various logic (e.g., if-then statements) can be used when processing the information. Note also that information can be retrieved for an event from the descriptor object corresponding to the event, such as determining that the PC corresponding to the first event entry is the hexadecimal value 83 (as shown in the first descriptor object). Finally, after the information of interest has been extracted and processed appropriately, the trace information can be displayed to a user. Those skilled in the art will appreciate that the trace information can be displayed in a variety of ways, and that user-defined display functions could be used to extract and process trace information.

Figure 5A:
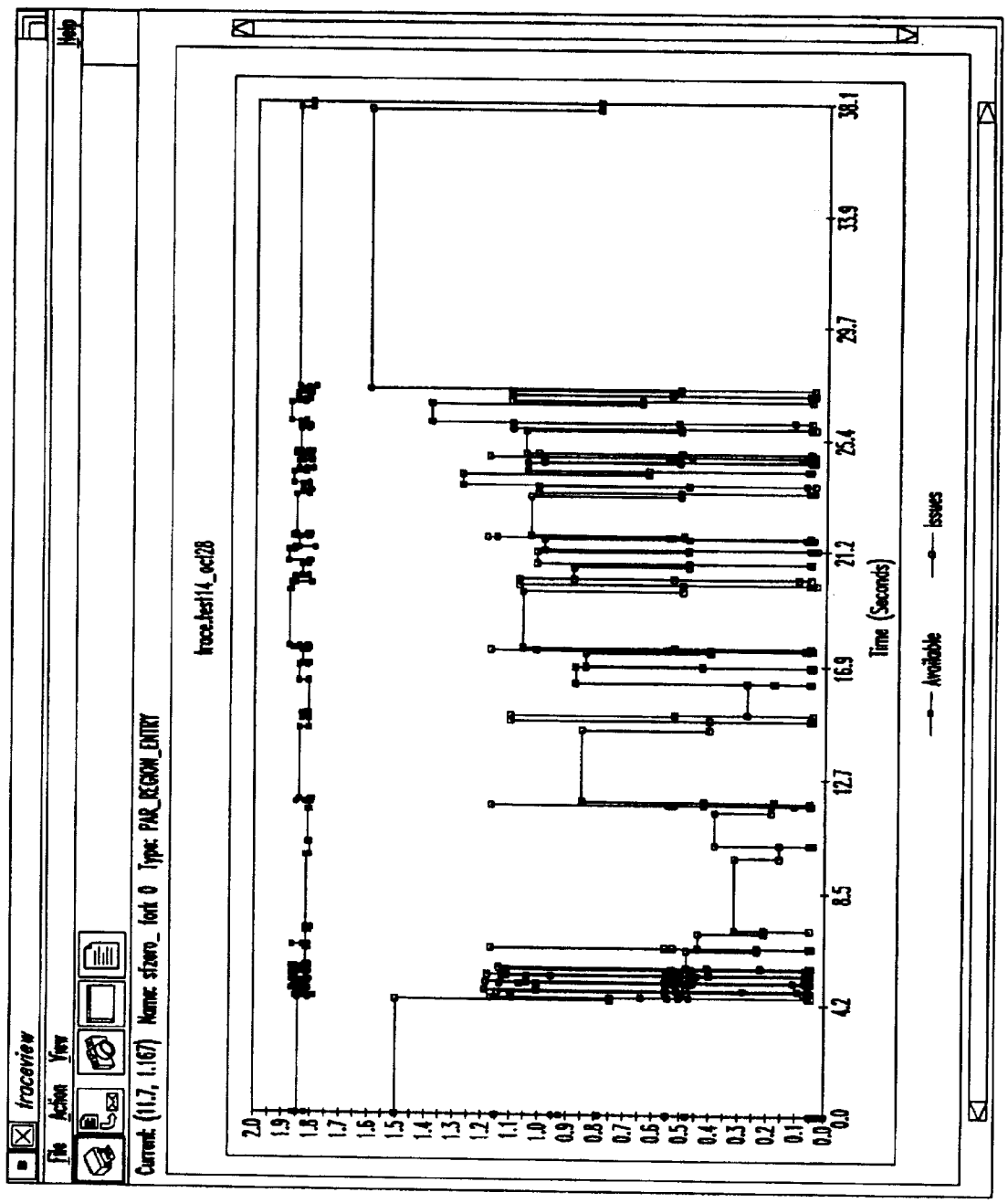

FIGS. 5A–5I illustrate examples of various trace information display screens. Referring first to FIG. 5A, a 2-D graph showing available_rate and issue_rate information is displayed. The available_rate data shows the number of possible instruction slots per cycle which are available to be executed for the task being traced, while the issue_rate data shows the number of instructions actually executed per cycle for the task. Note that a maximum of 1 instruction slot per processor per cycle is available in the illustrated embodiment, and that if multiple processors are executing the task then the information to be displayed is aggregated (i.e., there may be 2 possible available instructions if two processors are used during the execution of the task). As indicated previously, information such as the issue_rate and available rate can be extracted from an execution trace information file by specifying the various hardware counter values of interest. Note also that other types of information could also be added, either automatically or manually, such as annotations showing the function name corresponding to one or more events.

Figure 5B:
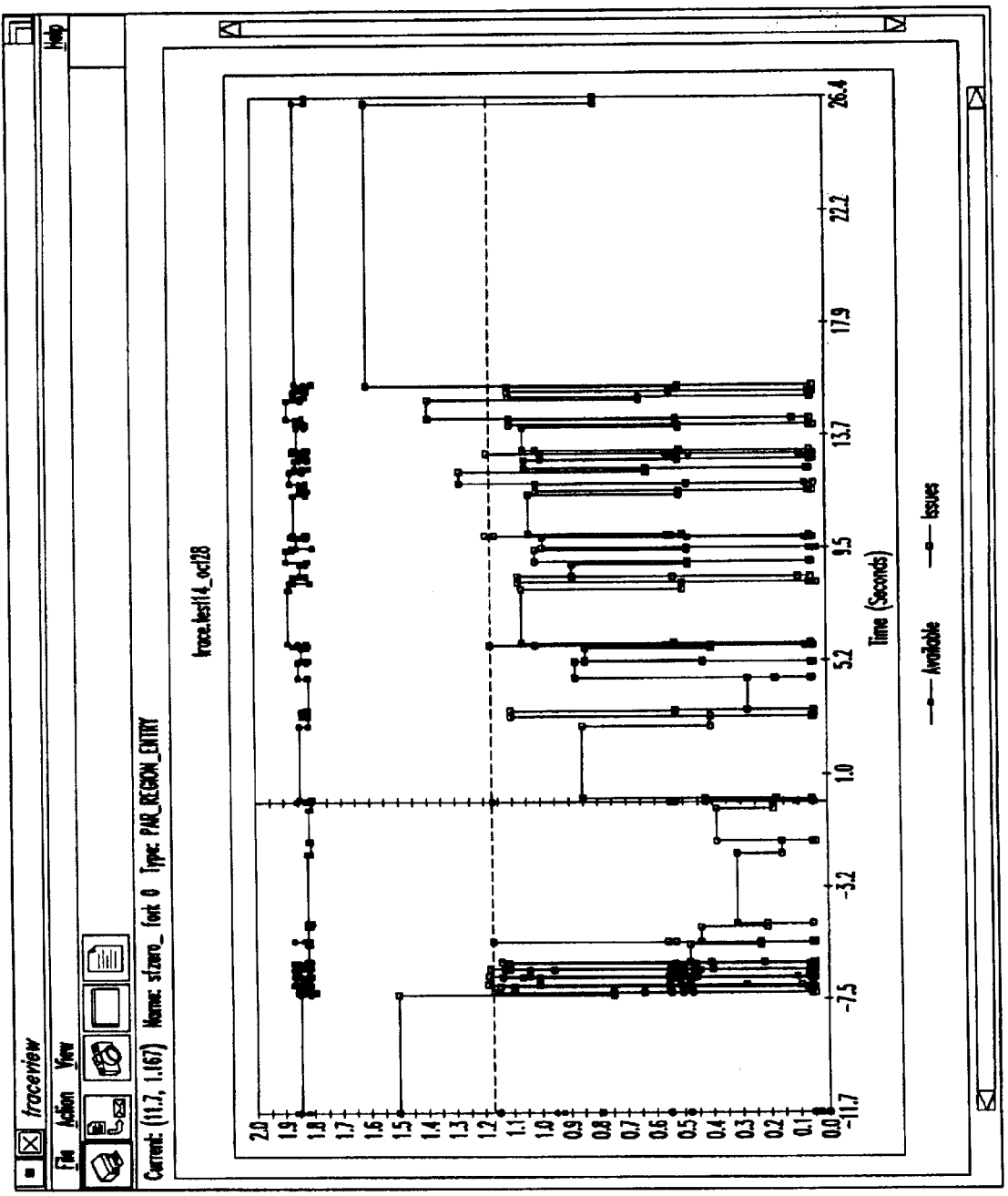
Figure 5C:
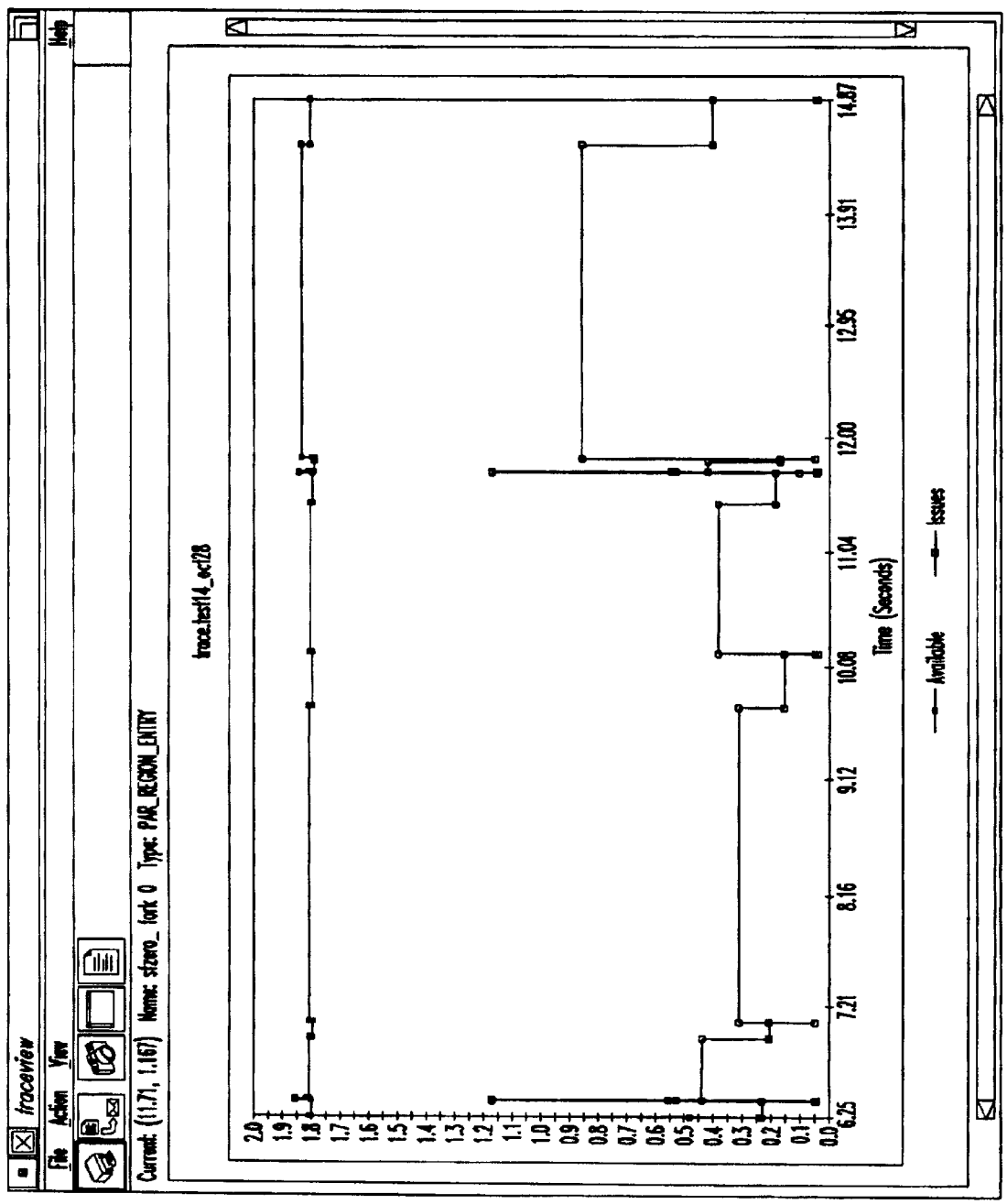

As previously discussed, a user can manipulate displayed trace information data in a variety of ways. For example, FIG. 5B illustrates that a user can modify the data displayed in FIG. 5A by specifying a new processor cycle (time) value along the x-axis, and by then redisplaying the same information using the specified cycle as the next x-axis origin. Similarly, FIG. 5C illustrates that the user can specify a portion of the displayed data and examine the data in greater detail by zooming in on the specified data.

Figure 5D:
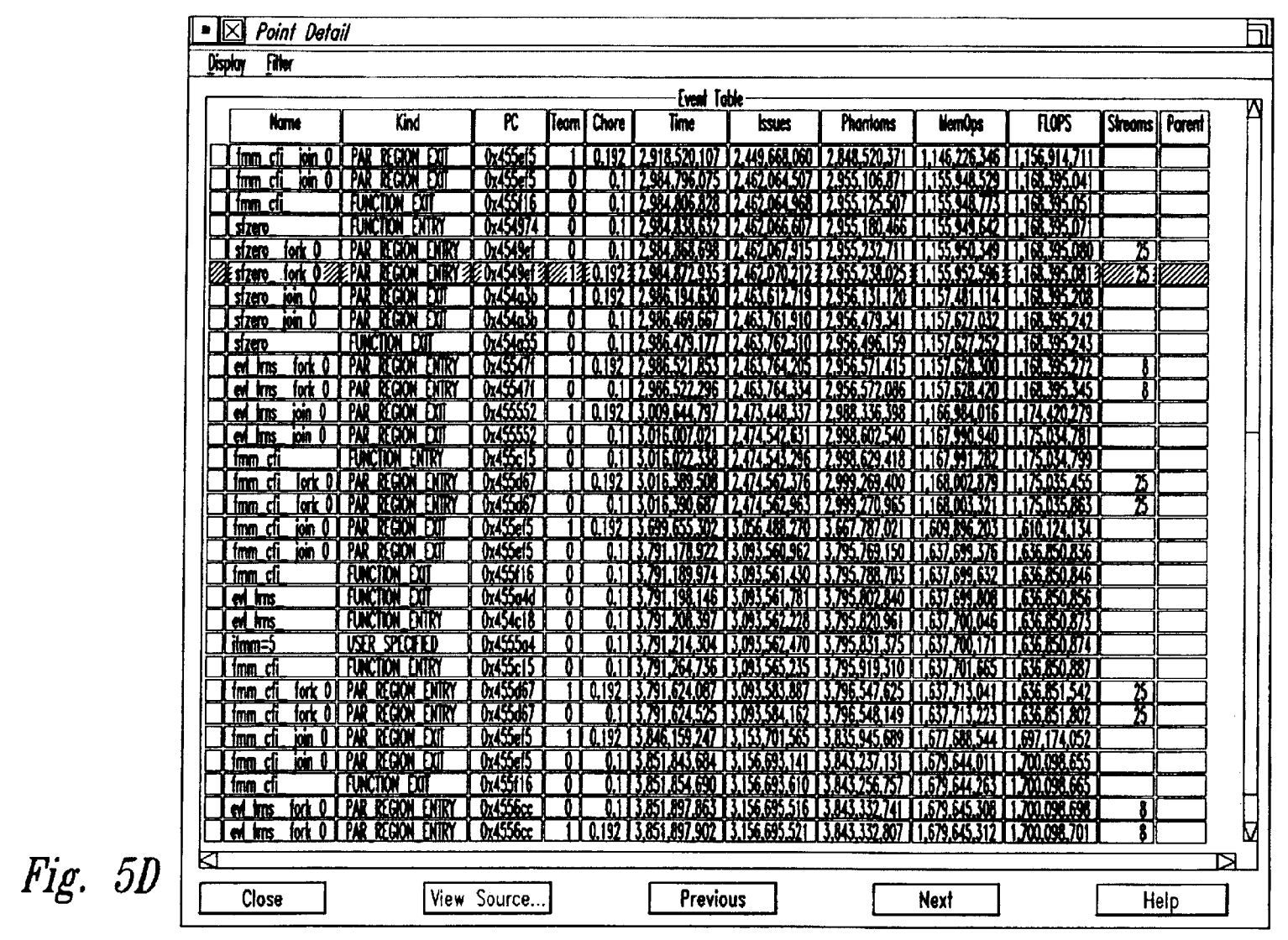

FIGS. 5D and 5E illustrate that the user can display additional data for one or more selected events, such as by indicating one or more displayed x-y event points in the 2-D graph. With respect to FIG. 4D, the user can request that some or all of the raw data for the event be displayed, and as discussed previously a display_format specified for this type of event can be used to display the data in tabular form. With respect to FIG. 5E, the user can request that the source code containing the sample point which generated a specified event be displayed, and the source code is then illustrated. Note that additional information can be shown with the source code, such as locations of sample points, indications of regions which the compiler designated as parallelizable, and explanations of why other portions of the code could not be parallelized.

Figure 5F:
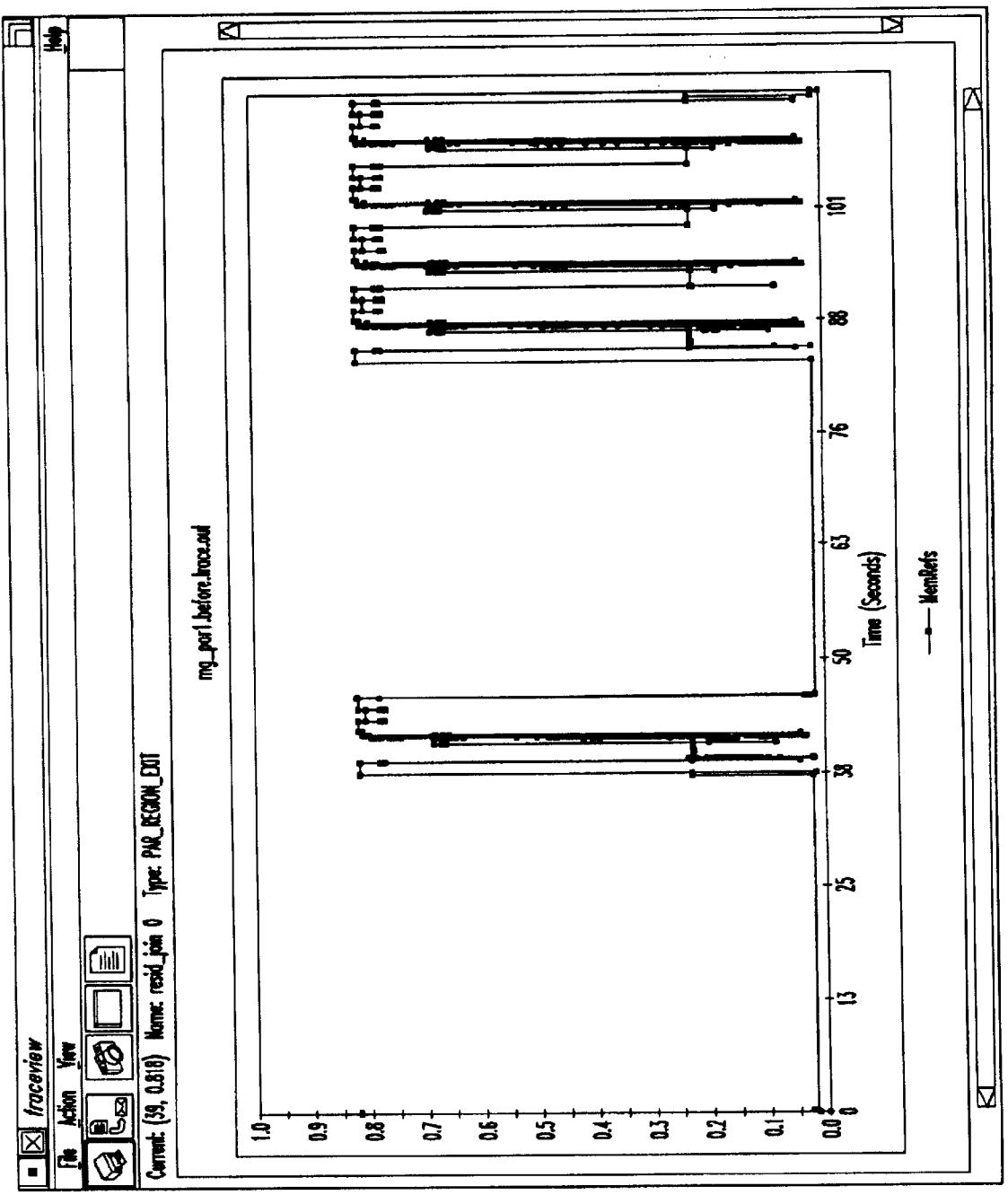
Figure 5G:
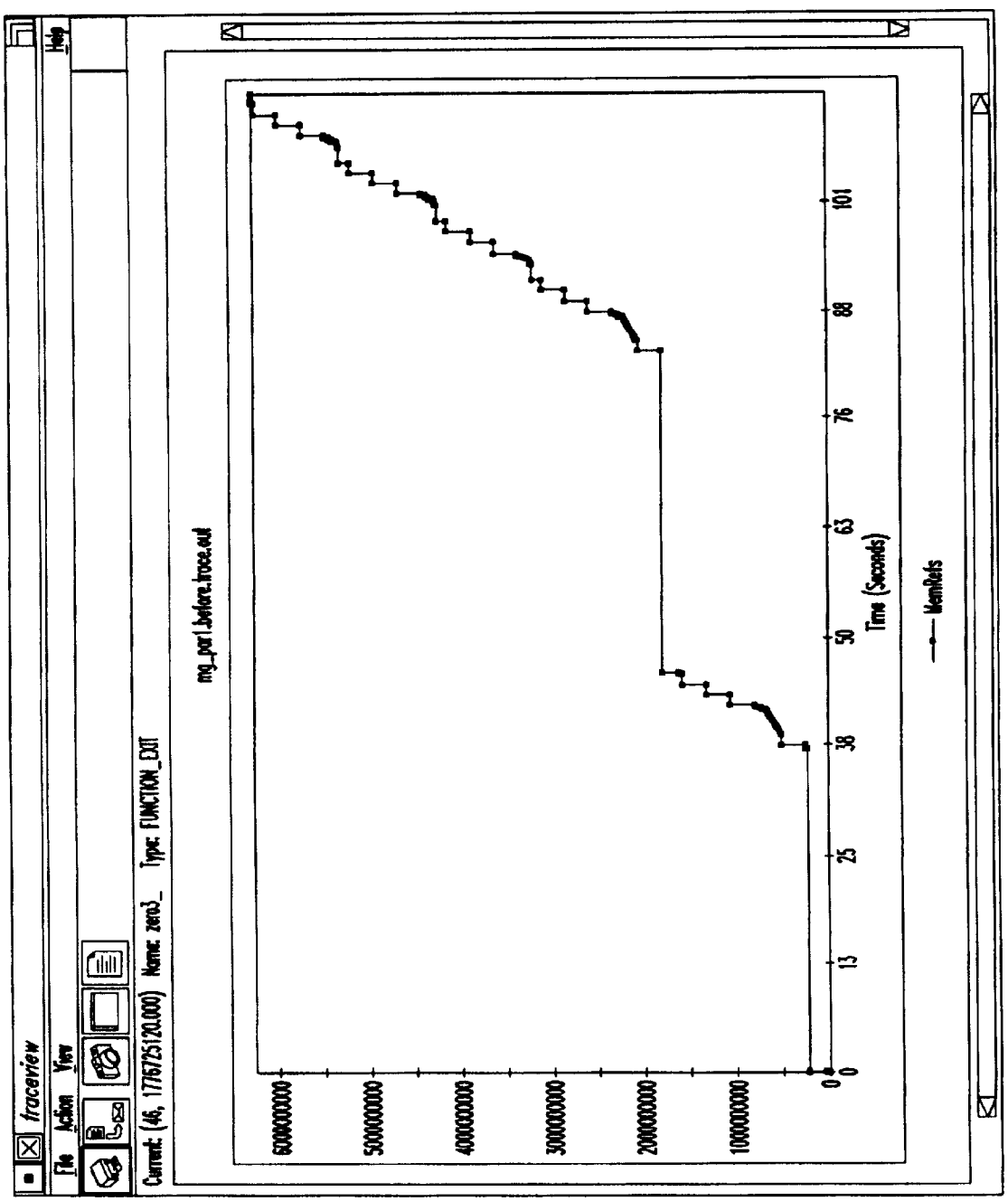
Figure 5H:
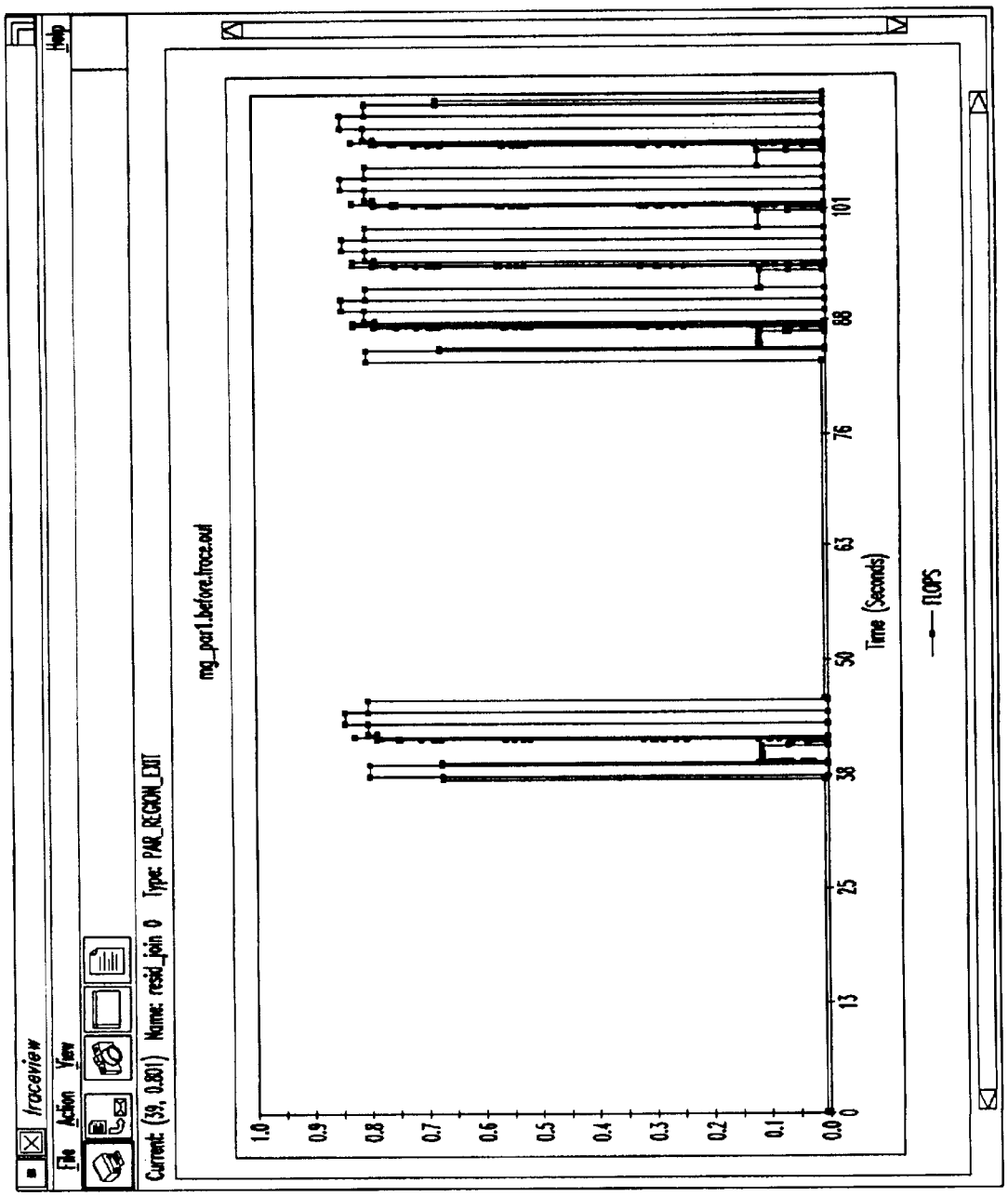

FIGS. 5F, 5G and 5H display different types of trace information, such as the rate of memory references, the total cumulative number of memory references, and the rate of FLOPS being issued. Note that the information can be displayed regardless of whether a single processor is used to execute the task for which the trace information is generated, or whether multiple processors are used.

Figure 5I:
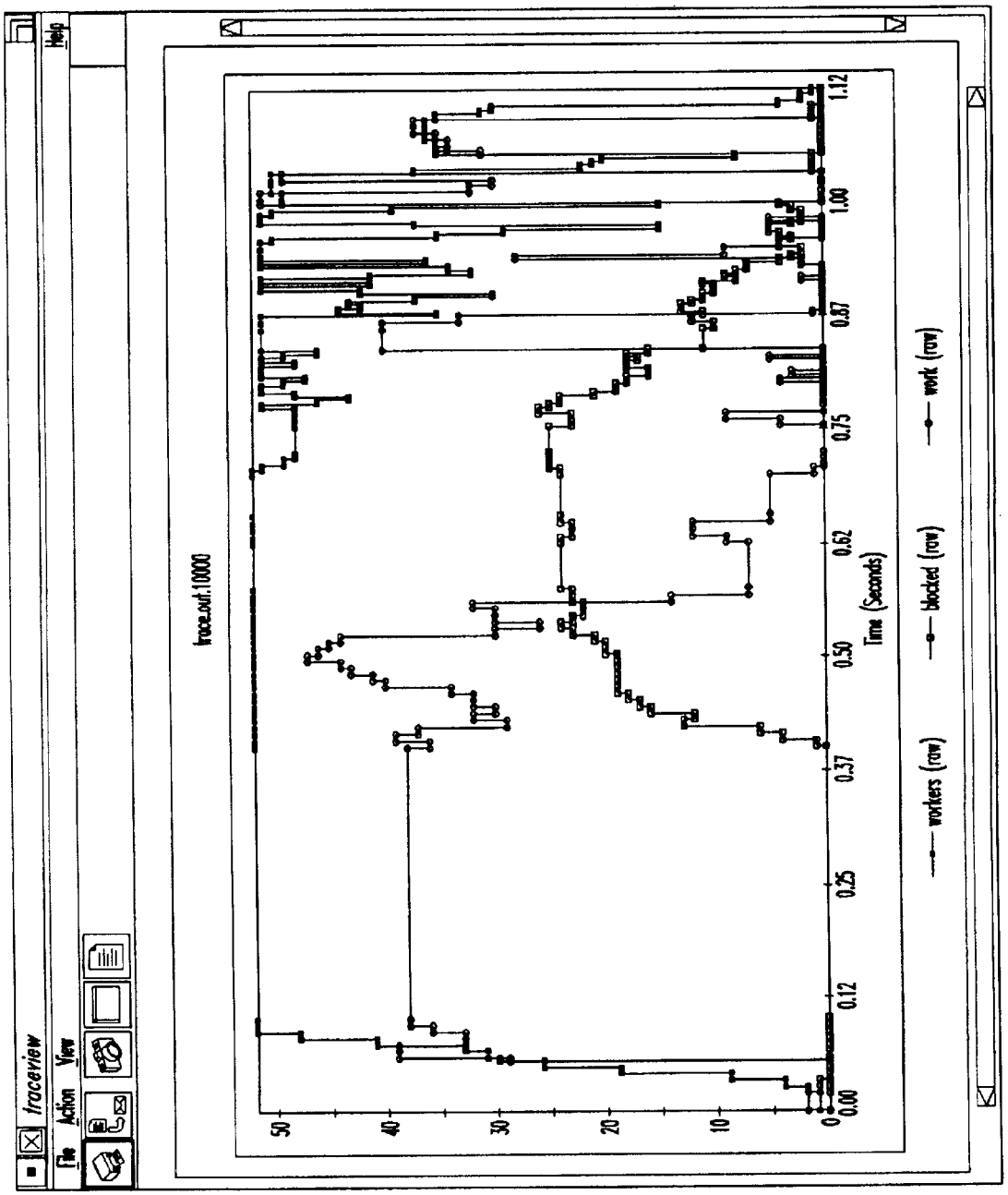

FIG. 5I illustrates a graph showing measures of system performance other than those generated directly from hardware counters, illustrating how effectively the various software threads are being executed. For example, the total number of threads (workers), the number of blocked threads whose execution cannot currently resume (blocked), and the number of threads which are ready to be executed but are not yet executing (work) are shown. If a significant number of threads are often ready to be executed but are not being executed, task execution may be improved by adding more streams to the one or more protection domains executing the task, or by adding additional protection domains (such as on a different processor).

Those skilled in the art will appreciate that a wide variety of other types of graphs and information displays can be shown for trace information, including by using user-defined display functions (such as by using the exemplary logic illustrated with respect to FIG. 4C). In addition, a wide variety of other user manipulations of displayed trace information can be performed.

Figure 6:
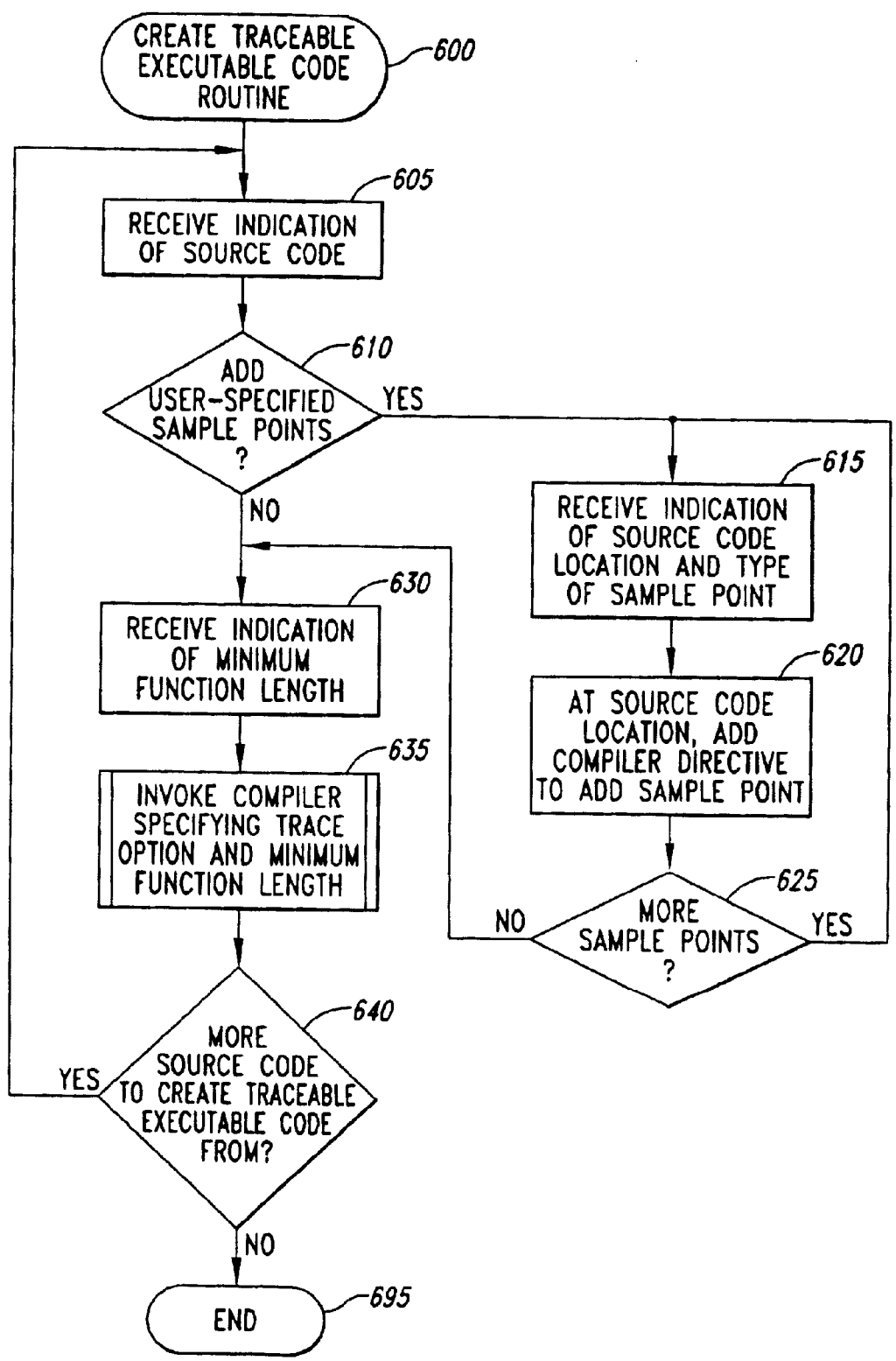
FIG. 6 is a flow diagram of an embodiment of the Create Traceable Executable Code routine.

FIG. 6 is a flow diagram of an embodiment of the Create Traceable Executable Code routine. The routine creates traceable executable code from source code by adding a variety of sample points to locations in the source code, and then instructing the compiler to insert appropriate instructions in the source code at each sample point location before the source code is compiled. The added instructions will, when executed, retrieve current values for a variety of types of hardware-supported values (e.g., from protection domain state and processor state counters) and software-supported values (e.g., the current ID for the executing thread and its corresponding team). The added sample points can be of different types which gather and report different types of trace information.

The routine begins at step 605 where an indication of source code to be compiled is received. The routine continues to step 610 to determine whether any user-specified sample points are to be added to the source code at the current time. If so, the routine continues at step 615 to receive an indication of a location in the source code and of a type of sample point to be added. The routine then continues at step 620 to add a compiler directive at the source code location that will indicate to the compiler to add a sample point of the specified type. The routine then continues at step 625 to determine if there are more sample points to be added, and if so returns to step 615. Those skilled in the art will appreciate that the source code may already contain one or more compiler directives to add sample points, such as those explicitly added by a developer while creating the source code.

If it is instead determined in step 610 that there are no user-specified sample points to be added or in step 625 that there are not more sample points, the routine continues at step 630. In step 630 the routine receives an indication of a minimum function length of the source code functions for which trace information will be gathered. In the illustrated embodiment, function entry and exit points are considered to be points of interest at which sample points may be added. Correspondingly, the compiler can be notified to add sample points at the entry and exit points for all functions that fit specified criteria, such as having a number of statements that meet or exceed a specified minimum function length. Those skilled in the art will appreciate that other types of criteria could be specified with which to select functions.

After step 630, the routine continues at step 635 to invoke the compiler, specifying that trace information is to be added to the source code and specifying a minimum function length. Those skilled in the art will appreciate that specifying a minimum function length of zero will instruct the compiler to add sample points to all functions, and that some functions (e.g., the top-level function) may have sample points added automatically even if they do not meet the specified criteria. After step 635, the routine continues at step 640 to determine if there is more source code for which to create traceable executable code from, and if so returns to step 605. If not, the routine ends at step 695.

Figure 7A:
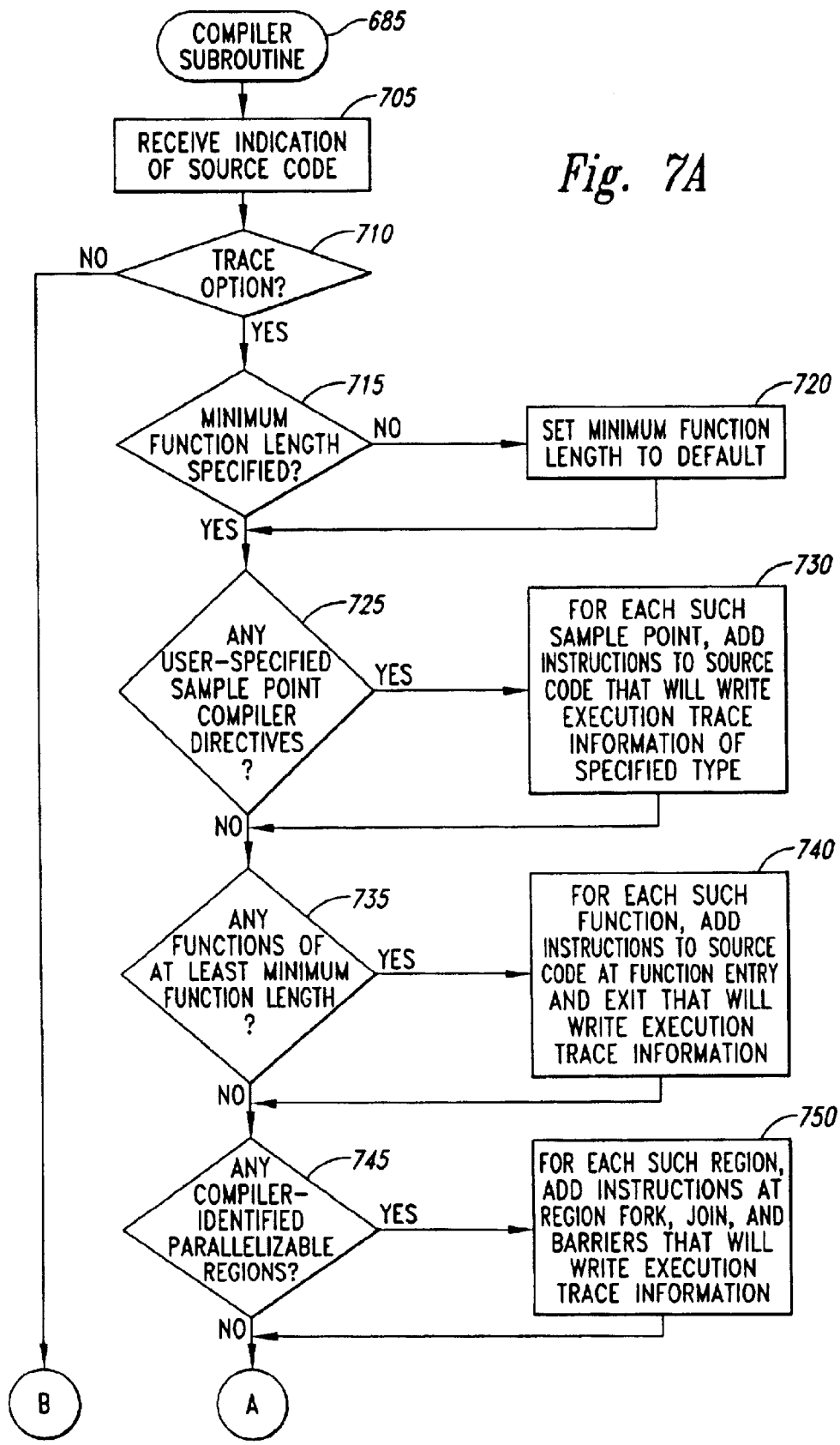
FIGS. 7A and 7B are flow diagrams of an embodiment of a Compiler subroutine supporting a trace option.
Figure 7B:
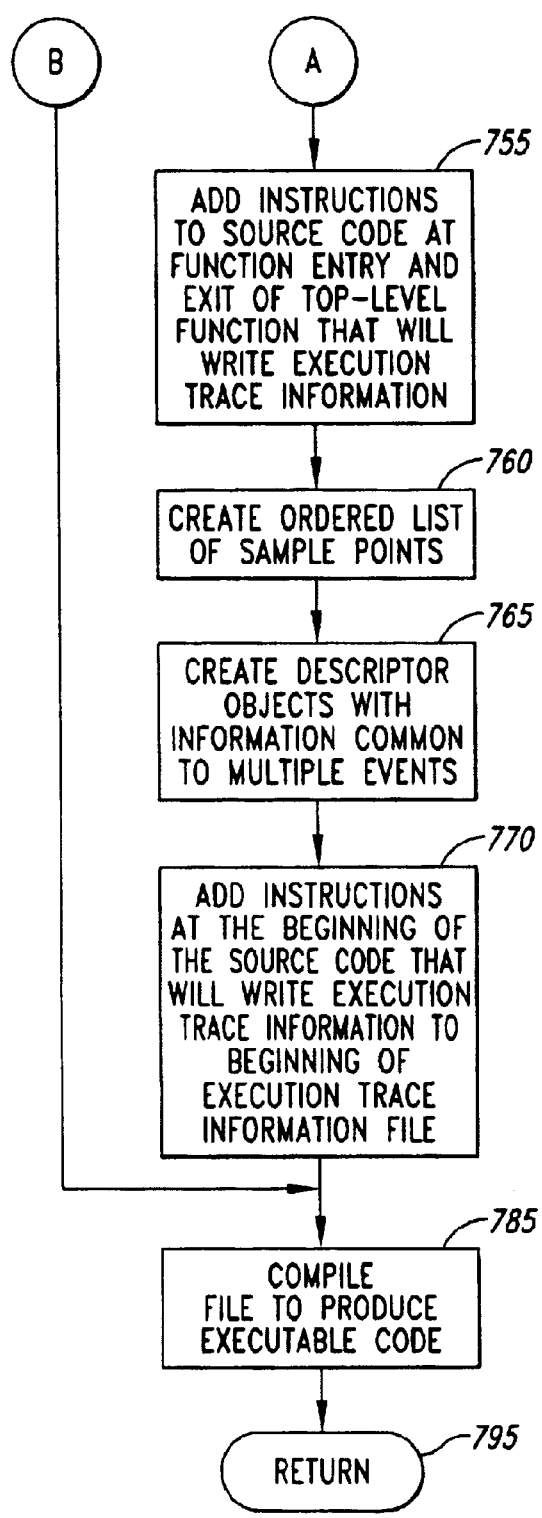

FIGS. 7A and 7B are flow diagrams of an embodiment of the Compiler subroutine 635. The Compiler subroutine is invoked to compile source code into executable code, and provides an option in which the generated executable code provides trace information during execution. In addition, various types of compiler instructions can be specified, such as a minimum function length for selecting the source code functions for which sample points will be added to the function entry and exit points.

The subroutine begins at step 705 where an indication of the source code to be compiled is received. The subroutine continues at step 710 to determine if the trace option has been specified for the source code. If so, the subroutine continues at step 715 to determine if a minimum function length has been specified. If not, the subroutine continues at step 720 to set the minimum function length to a default value such as 50. In alternate embodiments, the subroutine could instead add sample points for all functions or for no functions. After step 720, or if it was instead determined in step 715 that no minimum function length was specified, the subroutine continues at step 725 to determine if any user-specified sample point compiler directives are present in the source code. If so, the subroutine continues at step 730 to add instructions to the source code for each such sample point such that when the added instructions are executed they will write execution trace information of the type specified for that type of sample point.

After step 730, or if it was instead determined in step 725 that no such user-specified sample points were present, the subroutine continues at step 735 to determine if any functions of at least the minimum function length are present in the source code. If so, the subroutine continues at step 740 to add sample point instructions to the source code at the function entry and exit points for each such function. These added instructions will, when executed, write execution trace information related to the function entry and exit.

After step 740, or if it was instead determined in step 735 that there were no functions of at least the minimum function length, the subroutine continues to step 745 to determine if there are any compiler-identified parallelizable regions. If so, the subroutine continues at step 750 to add sample point instructions at the fork, join, and barrier points for each such region. These instructions will, when executed, write execution trace information related to the parallelizable regions. After step 750, or it was instead decided in step 745 that no such parallelizable regions were identified, the subroutine continues at step 755 to add sample point instructions at the function entry and exit points of the top-level function for the source code if such sample points are not already present.

In steps 760–770, the compiler will gather information related to the sample points, and will write instructions to the source code so that descriptor objects will be written to the trace information file. The descriptor objects will contain information common to multiple events, such as multiple events generated from a single sample point. The subroutine thus continues at step 760 to create an ordered list of the sample points in the source code. The subroutine then continues at step 765 to create a descriptor object for each group of sample points which will share common trace information with other sample points, and for each sample point which does not share common trace information with any other sample points. For each descriptor object, the subroutine will gather common information such as the source code function name for the function containing the one or more sample points as well as the PC corresponding to the function. The subroutine then continues at step 770 to add instructions at the beginning of the source code such that when the instructions are executed before the top-level function, the execution trace information descriptor objects will be written to the beginning of the trace information file to be created. After step 770, or if it was instead determined in step 710 that the trace option was not specified, the subroutine continues at step 785 to compile the source code to produce executable code. Unless the trace option was not specified, the produced code will be traceable. The subroutine then continues to step 795 and returns. Those skilled in the art will appreciate that unless all of the sample points are manually specified by the developer, a compiler which supports generating traceable code is needed.

Figure 8:
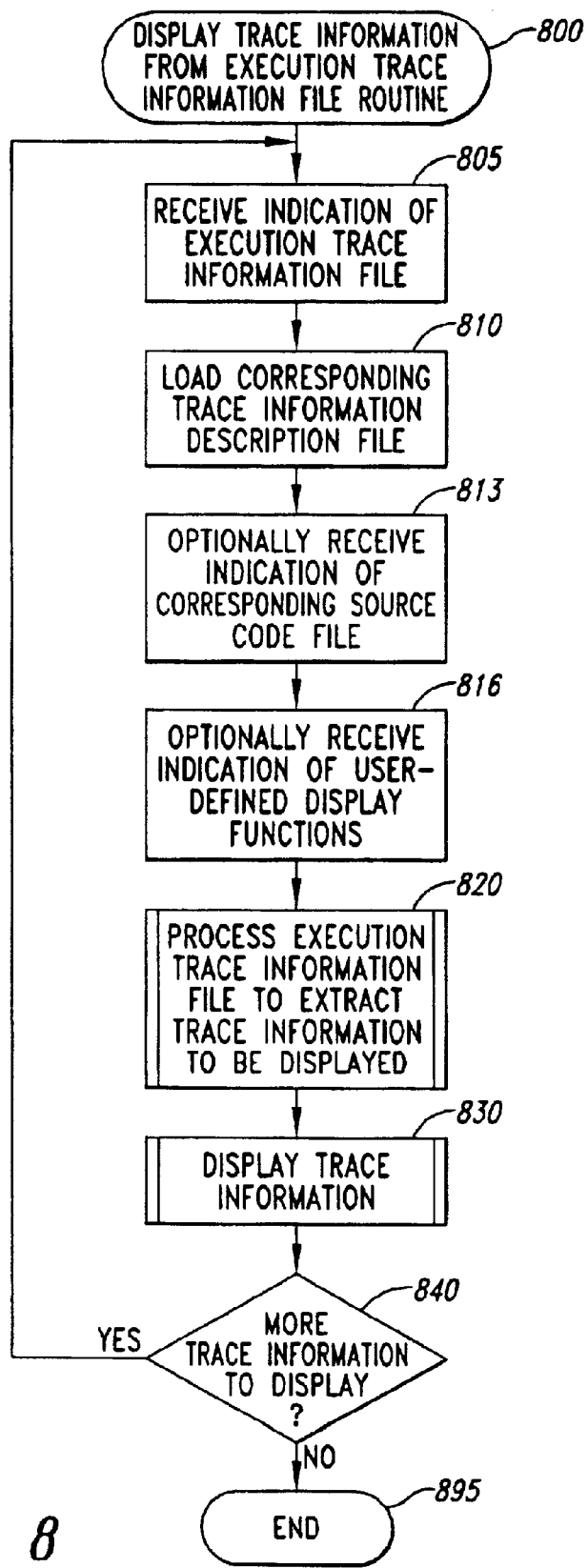
FIG. 8 is a flow diagram of an embodiment of the Display Trace Information From Execution Trace Information File routine.

FIG. 8 is a flow diagram of an embodiment of the Display Trace Information From Execution Trace Information File routine 800. The routine receives a trace information file that has been generated during the execution of an executable traceable code file, and processes the trace information to extract various types of performance measure information of interest. The extracted information is then displayed to the user in an interactive manner such that the user can specify additional information of interest to be displayed.

The routine begins at step 805 where an indication of an execution trace information file is received. The routine continues at step 810 where a trace information description file that corresponds to the execution trace information file is loaded. In step 813, the routine then optionally receives an indication of the source code corresponding to the execution trace information file, and then continues to step 816 to optionally receive an indication of one or more user-defined display functions. After the various information has been specified, the routine continues at step 820 to execute the Process Execution Trace Information File To Extract Trace Information To Be Displayed subroutine. The routine then continues to step 830 to execute the Display Trace Information subroutine 830. The routine continues to step 840 to determine of there are more trace information files to be displayed. If so, the routine returns to step 805, and if not the routine ends at step 895.

Those skilled in the art will appreciate that default display options may be used when user-defined display functions are not specified or in addition to such user-defined display functions. Moreover, those skilled in the art will appreciate that multiple types of extracted information can be displayed simultaneously, either on a single graph or on multiple graphs. In addition, those skilled in the art will appreciate that execution trace information can be displayed in a variety of manners, such as 2-D and 3-D graphs, as textual information, or as raw data in tabular formats.

Figure 9:
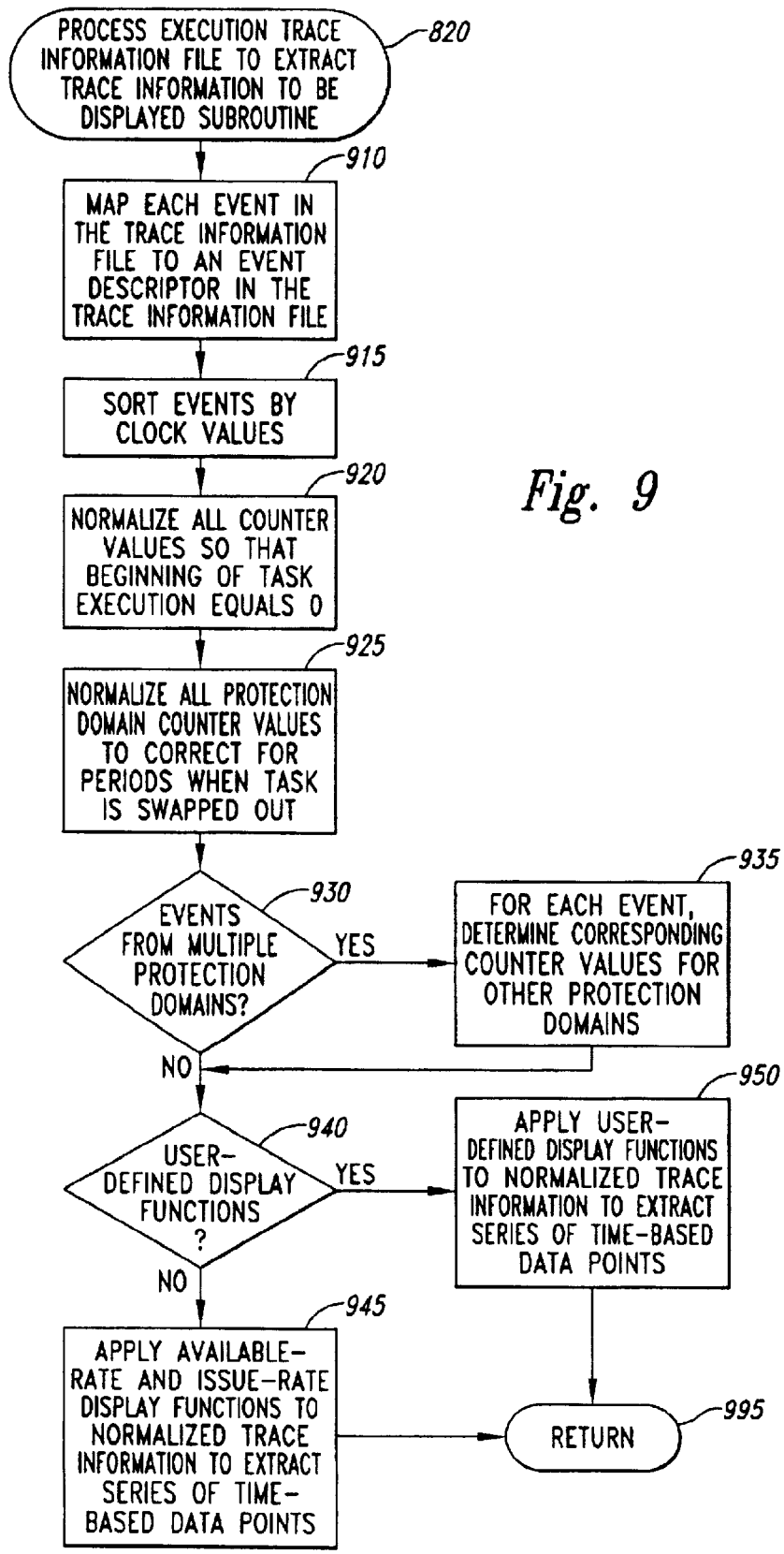
FIG. 9 is a flow diagram of an embodiment of the Process Execution Trace Information File To Extract Trace Information To Be Displayed subroutine.

FIG. 9 is an embodiment of the Process Execution Trace Information File To Extract Trace Information To Be Displayed subroutine 820. The subroutine receives an execution trace information file, as well as a trace information description file that defines a structure and meaning for the types of events present in the trace information. The subroutine normalizes the various values and then extracts information to be displayed, using either user-defined display functions or default display functions.

The subroutine begins in step 910 where each event in the execution trace information file that references an event descriptor object is mapped to the corresponding descriptor object in the file. As previously described, these event descriptor objects will provide additional information about the event. The subroutine then continues at step 915 to sort all events chronologically by using the clock values stored with the event. Since clock values are synchronized across all processors, the sorted events will reflect the execution order of the events regardless of the processor on which the event is generated. The subroutine then continues at step 920 to normalize all counter values so that the beginning of the task execution corresponds to a value of zero. Thus, if such counters had begun incrementing at a time earlier than the beginning of the task execution (e.g., upon the boot of the processor), the value of each counter at the beginning of the task execution must be subtracted from all later values for that counter.

The subroutine then continues at step 925 to normalize all protection domain counter values to account for periods when the task was not executing in the protection domain, such as when the task was swapped out of the protection domain. Thus, if the protection domain counters continued to increment while the task was swapped out, such as a counter for the number of instructions issued in the protection domain, the counter values after the swapped-out period are adjusted so that they reflect only instruction issues that occurred during execution of the task. The subroutine then continues at step 930 to determine if information from multiple protection domains is present in the trace information file. Information from multiple protection domains may be available in a variety of circumstances, such as when the task executes in a parallel manner in multiple protection domains on either a single processor or on multiple processors, or when a non-task process adds trace information to the execution trace information file (e.g., from the operating system or from a background daemon periodically monitoring the performance measure values for the task).

If it is determined in step 930 that there is information from multiple protection domains, the subroutine continues at step 935 to standardize the performance measure values of events from one protection domain with those from other protection domains. For example, each event may be displayed with a current value for hardware-supported counters in all protection domains, but there may be some events for one protection domain that do not have corresponding events at the same time from the other protection domains. If so, the values for the hardware-supported counters in that other protection domain at that time will be estimated. Those skilled in the art will appreciate that such estimation can be conducted in a variety of ways, such as by interpolating the values based on the most recent values in that protection domain before and after the time of interest. After step 935, or if it was instead determined in step 930 that trace information from multiple protection domains is not present, the subroutine continues at step 940.

In steps 940 through 950, the subroutine will extract appropriate trace information from the execution trace information file. This extracted information will then be displayed to the user. In step 940, the subroutine determines if any user-defined display functions have been supplied. If so, the subroutine continues at step 950 to apply those display functions to the normalized trace information and to extract the information of interest from each event containing such information. This will create a series of time-based data points containing the information of interest. For example, the number of cumulative instruction issues over the life of the task execution may be of interest, or alternately the rate of instruction issues for a period of time may be of interest. If so, the values for the instruction issues counter for each protection domain will be extracted for each event that contains a value for that counter. These extracted values, combined with the times at which they were generated, will create a series of time-based data points.

If it is instead determined in step 940 that user-defined display functions are not supplied, the subroutine continues to step 945 to apply default display functions to the normalized trace information to extract information to be displayed. In the illustrated embodiment, the available_rate (indicating the number of issue slots per time period available to the executing task) and the issue_rate (indicating the number of instructions per time period that issue for the task) for the executing task are used as the default display functions. After steps 945 or 950, the subroutine continues to step 995 and returns.

Figure 10A:
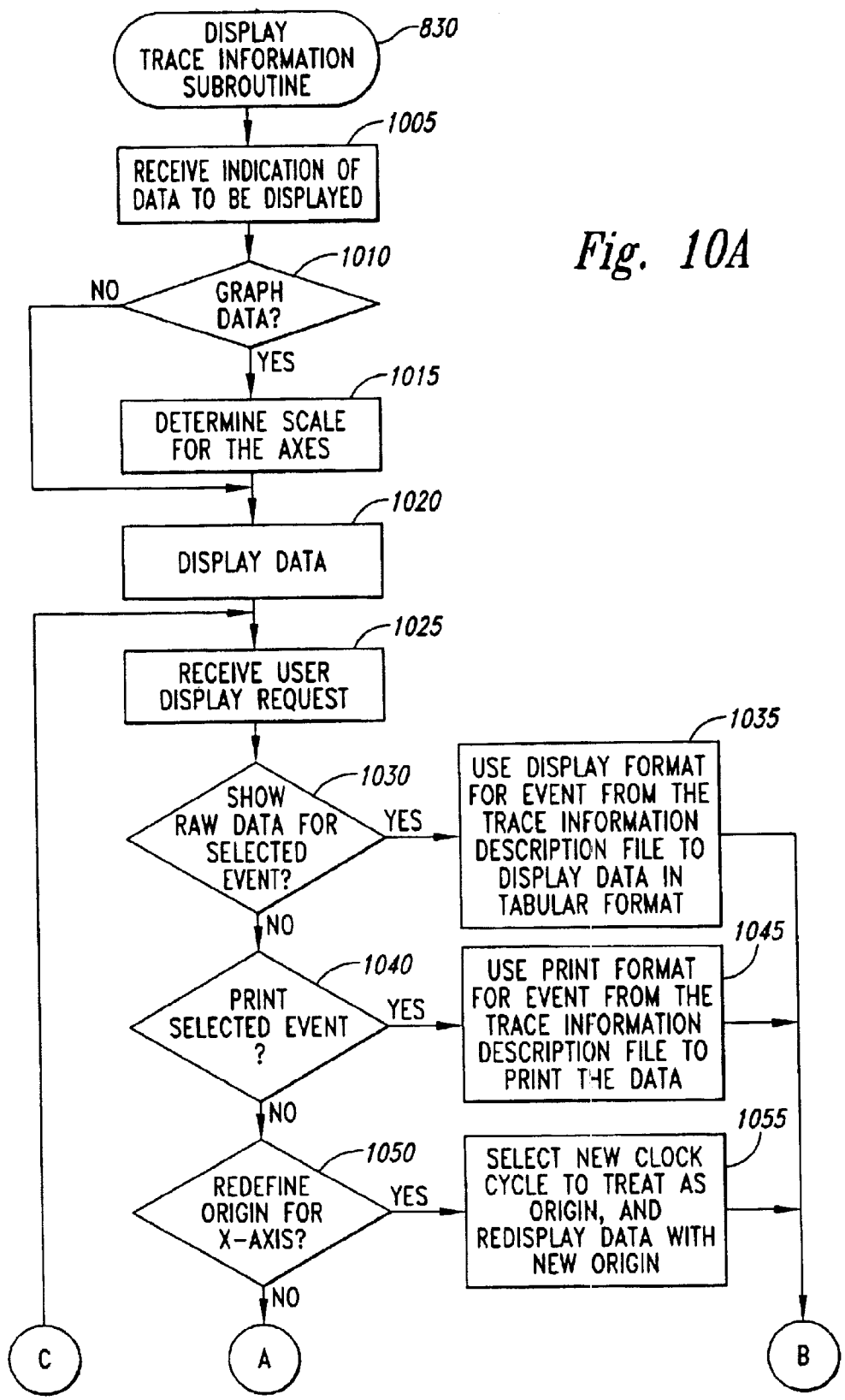
FIGS. 10A and 10B are flow diagrams of an embodiment of the Display Trace Information subroutine.
Figure 10B:
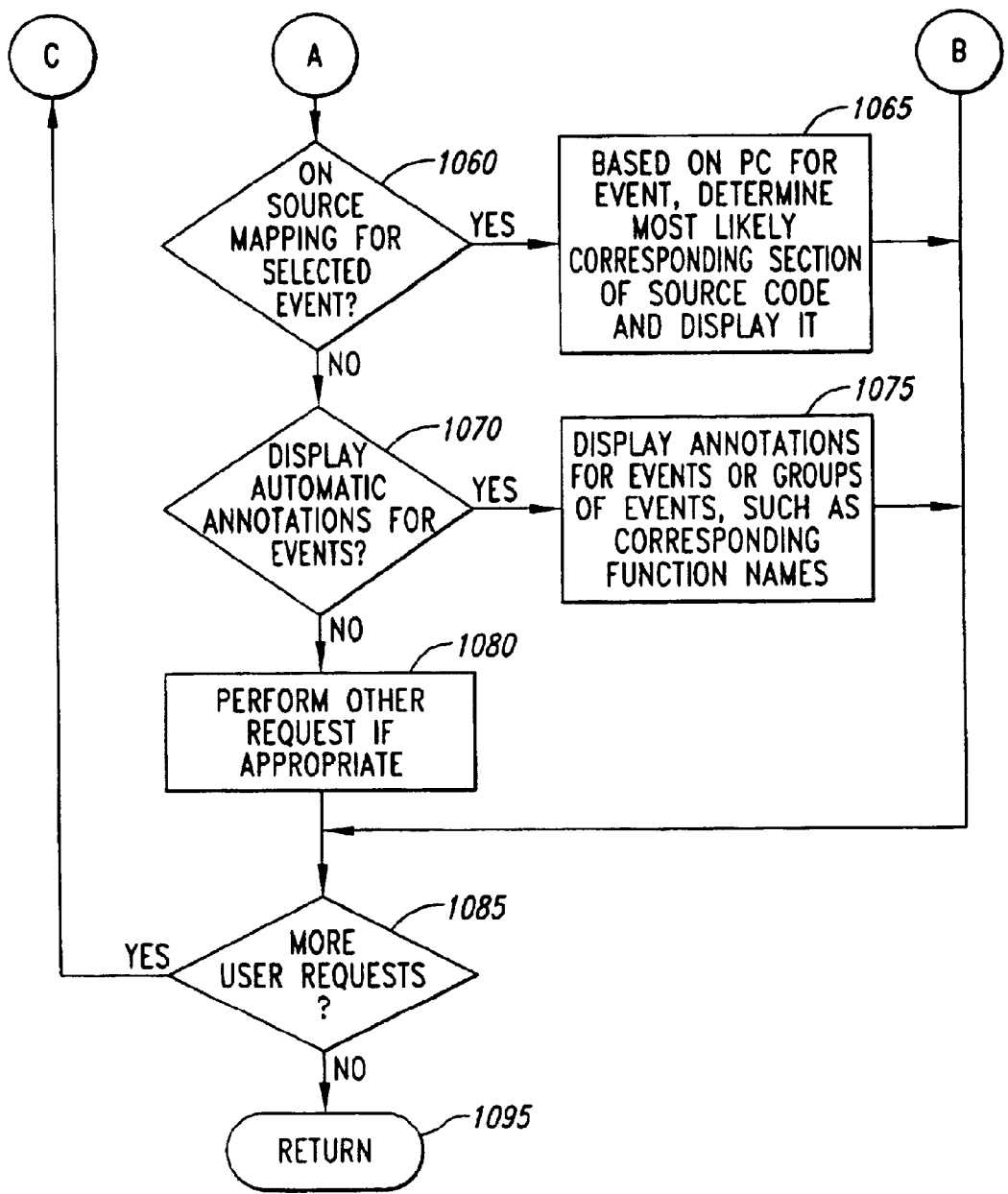

FIGS. 10A and 10B are flow diagrams of an embodiment of the Display Trace Information subroutine 830. The subroutine receives an indication of extracted trace information to be displayed, displays the data, and then processes user requests related to modifying the display or displaying other trace information.

The subroutine begins at step 1005 where an indication of the data to be displayed is received. The subroutine continues to step 1010 to determine if the data to be displayed corresponds to a 2-D or to a 3-D graph. If so, the subroutine continues to step 1015 to determine the appropriate scale for the axes. After step 1015, or if it was instead determined in step 1010 that the data is not to be graphed, the subroutine continues to step 1020 to display the data. In step 1025, the subroutine then receives a user display request, and continues to steps 1030–1080 to process the request.

After step 1025, the subroutine continues to step 1030 to determine whether the request is to show raw data for a selected event. If so, the subroutine continues at step 1035 to extract the information for the event from the execution trace information file, and then uses a defined display format for this event type from the trace information description file to display the data in tabular form. If it is instead determined in step 1030 that the request is not to show raw data, the subroutine continues at step 1040 to determine whether the request is to print the trace information corresponding to a selected event. If so, the subroutine continues at step 1045 to extract the trace information for the event from the execution trace information file, and then use defined print formats from the trace information description file for the event type to print the data.

If it is instead determined in step 1040 that the request is not to print the selected event, the subroutine continues at step 1050 to determine whether the request is to redefine the origin of the x-axis for a displayed 2-D graph. If so, the subroutine continues at step 1055 to receive an indication of the new x-axis origin, and then redisplays the trace information as if the data began at the new origin. In the illustrated embodiment, the x axis of 2-D graphs corresponds to time and displays clock cycles, so redefining the origin is analogous to displaying the trace information as if task execution had begun at the specified time.

If it is instead determined in step 1050 that the request is not to redefine the origin, the subroutine continues at step 1060 to determine if the request is to do source mapping for a selected event. If so, the subroutine continues at step 1065 to determine the PC for the selected event and to then determine the most likely section of source code that corresponds to the PC. Those skilled in the art will appreciate that source code mapping can be performed in a variety of ways, such as by creating an annotated version of the source code with one or more source code statements mapped to each PC value or instead by automatically calculating what source code corresponds to a PC value based on where the executable code is loaded in memory and using any compiler optimizations that affect how many executable statements are produced for each source code statement.

If it is instead determined in step 1060 that the request is not to perform source mapping for a selected event, the subroutine continues at step 1070 to determine if the request is to automatically add annotations corresponding to one or more selected events or to all events. If so, the subroutine continues to step 1075 to display appropriate annotations for the specified events, such as the name of the function containing the sample code that generated the events. Those skilled in the art will appreciate that a variety of other types of annotation information could instead be displayed. If it is instead determined in step 1070 that the user request is not to automatically add annotations, the subroutine continues to step 1080 and performs the user request if appropriate. After step 1080, the subroutine continues to step 1085 to determine if there are more user requests. If so, the subroutine returns to step 1025, and if no the subroutine returns in step 1095.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer-implemented method for analyzing performance of execution of a task by a computer system, the computer system with a processor having multiple streams for executing multiple threads of the task, the analyzing using trace information generated during the execution including values of variables maintained by the hardware of the computer system or by software executing on the computer system, the method comprising:

receiving an indication of a program for which performance of execution of the program as a task on the computer system is to be analyzed;

generating an executable version of the program by receiving an indication from a user to generate trace information of a specified type at a specified location of the program;

automatically identifying a plurality of locations of the program at which to generate trace information of specified types; and compiling the program to create the executable version, the compiling such that groups of instructions are added to the program at the specified location and at the plurality of identified locations, the added instructions to generate trace information of the specified types when executed;

generating the trace information by executing the executable version on the computer system as a task, the executing performed by multiple streams executing multiple threads of the task, the execution of each added group of instructions to generate current values of the variables as part of the generated trace information;

analyzing the generated trace information to extract execution information of interest by using a description of the specified types of trace information to group the generated trace information into events each reflecting execution of a group of added instructions;

when information for an event is separated in the generated trace information, creating a mapping to assist in retrieving the information for the event;

modifying the generated current values of the events so as to be normalized with respect to beginning of execution of the task;

modifying the generated current values of the events so that the values reflect only the execution of the task;

receiving an indication of the execution information of interest, the indicated execution information including at least one of the variables; and using the event groupings and the created mapping to extract the modified generated current values for the execution information of interest including the at least one of the variables;

displaying to a user the extracted execution information of interest; and in response to a user request, modifying the extracted execution information being displayed.

2. A computer-readable medium containing instructions for causing a computer system to perform the method of claim 1.

3. A computer system including components to perform the method of claim 1.

* * * * *

UNITED STATES PATENT AND TRADEMARK OFFICE
CERTIFICATE OF CORRECTION

PATENT NO. : 6,230,313 B1
DATED : May 8, 2001
INVENTOR(S) : Callahan, II et al.

It is certified that error appears in the above-identified patent and that said Letters Patent is hereby corrected as shown below:

Column 1,
Line 56, delete "is" between "to" and "be";

Column 3,
Line 56, "chronization" should be -- synchronization --;
Line 57, "bit" should be -- bits --;

Column 4,
Line 22, insert -- bit -- between "empty" and "is";
Line 26, "support" should be -- supports --;
Line 49, delete "is" between "be" and "needed";
Line 66, insert period between "condition" and "The";

Column 5,
Line 35, "35" should be -- 39 --;

Column 8,
Line 59, delete comma between "increasing and "values";

Column 12,
Line 5, delete "is" between "of" and "threads";

Column 13,
Line 66, delete comma after "been";

Column 14,
Line 35, delete comma between "permanent" and "storage";

Column 15,
Line 2, "nits" should be -- bits --;

UNITED STATES PATENT AND TRADEMARK OFFICE
CERTIFICATE OF CORRECTION

PATENT NO. : 6,230,313 B1
DATED : May 8, 2001
INVENTOR(S) : Callahan, II et al.

It is certified that error appears in the above-identified patent and that said Letters Patent is hereby corrected as shown below:

<u>Column 25, line 17 through Column 26, line 14,</u>
Should be:
-- analyzing the generated trace information to extract execution information of interest by
    using a description of the specified types of trace information to group the generated trace information into events each reflecting execution of a group of added instructions;
    when information for an event is separated in the generated trace information, creating a mapping to assist in retrieving the information for the event;
    modifying the generated current values of the events so as to be normalized with respect to beginning of execution of the task;
    modifying the generated current values of the event so that the values reflect only the execution of the task;
    receiving an indication of the execution information of interest, the indicated execution information including at least one of the variables; and
    using the event groupings and the created mapping to extract the modified generated current values for the execution information of interest including the at least one of the variables; --

Signed and Sealed this

Twenty-ninth Day of October, 2002

*Attest:*

*Attesting Officer*

JAMES E. ROGAN
*Director of the United States Patent and Trademark Office*